(12) United States Patent
Ge et al.

(10) Patent No.: US 12,081,403 B2
(45) Date of Patent: Sep. 3, 2024

(54) COMMUNICATION METHOD AND APPARATUS

(71) Applicant: HUAWEI TECHNOLOGIES CO., LTD., Shenzhen (CN)

(72) Inventors: Cuili Ge, Beijing (CN); Yanmei Yang, Beijing (CN)

(73) Assignee: Huawei Technologies Co., Ltd, Shenzhen (CN)

(*) Notice: Subject to any disclaimer, the term of this patent is extended or adjusted under 35 U.S.C. 154(b) by 0 days.

(21) Appl. No.: 17/971,150

(22) Filed: Oct. 21, 2022

(65) Prior Publication Data
US 2023/0037954 A1    Feb. 9, 2023

Related U.S. Application Data

(63) Continuation of application No. 17/137,029, filed on Dec. 29, 2020, now Pat. No. 11,522,761, which is a
(Continued)

(30) Foreign Application Priority Data

Jun. 30, 2018    (CN) .......................... 201810703100.9

(51) Int. Cl.
H04L 41/0893    (2022.01)
H04L 67/00    (2022.01)
(Continued)

(52) U.S. Cl.
CPC .......... *H04L 41/0893* (2013.01); *H04L 67/34* (2013.01); *H04W 24/02* (2013.01); *H04W 28/16* (2013.01); *H04W 48/18* (2013.01)

(58) Field of Classification Search
CPC . H04L 41/0893; H04L 67/34; H04L 41/0894; H04L 41/0895; H04L 41/40;
(Continued)

(56) References Cited

U.S. PATENT DOCUMENTS

2014/0153391 A1* 6/2014 Ludwig ............... H04L 41/0894
370/230
2018/0192471 A1* 7/2018 Li ......................... H04W 12/06
(Continued)

FOREIGN PATENT DOCUMENTS

CN    106411537 A    2/2017
CN    107332677 A    11/2017
(Continued)

OTHER PUBLICATIONS

"3rd Generation Partnership Project; Technical Specification Group Services and System Aspects; Architecture enhancements to facilitate communications with packet data networks and applications (Release 15)," 3GPP TS 23.682 V15.5.0, pp. 1-125, 3rd Generation Partnership Project, Valbonne, France (Jun. 2018).
(Continued)

Primary Examiner — Charles C Jiang
Assistant Examiner — Shawn D Miller
(74) Attorney, Agent, or Firm — Leydig, Voit & Mayer, Ltd.

(57) ABSTRACT

A communication method and an apparatus are provided. The method includes: A common application programming interface framework core function (CCF) network element first sends reference information of an application to a first network element. Therefore, the first network element determines network slice information corresponding to the application; and then the first network element sends the determined network slice information to the CCF network element. In this way, the CCF network element may determine the network slice information corresponding to the application, so that when an API invoker network element searches for an API, the CCF network element can accurately find, based on an API inquiry parameter, the API from a network slice corresponding to the network slice information.

14 Claims, 16 Drawing Sheets

Related U.S. Application Data continuation of application No. PCT/CN2019/093866, filed on Jun. 28, 2019.

(51) Int. Cl.
*H04W 24/02* (2009.01)
*H04W 28/16* (2009.01)
*H04W 48/18* (2009.01)

(58) Field of Classification Search
CPC .. H04L 41/5051; H04W 24/02; H04W 28/16; H04W 48/18; H04W 4/70
See application file for complete search history.

(56) References Cited

U.S. PATENT DOCUMENTS

| | | | |
|---|---|---|---|
| 2019/0020549 A1 | | 1/2019 | Kim |
| 2021/0037007 A1* | | 2/2021 | Gupta ................ H04W 12/084 |

FOREIGN PATENT DOCUMENTS

| | | |
|---|---|---|
| CN | 107889155 A | 4/2018 |
| CN | 107919974 A | 4/2018 |
| WO | 2017028561 A1 | 2/2017 |
| WO | 2017143047 A1 | 8/2017 |
| WO | 2017173259 A1 | 10/2017 |

OTHER PUBLICATIONS

"3rd Generation Partnership Project; Technical Specification Group Services and System Aspects; Functional architecture and information flows to support Common API Framework for 3GPP Northbound APIs; Stage 2 (Release 15)," 3GPP TS 23.222 V15.2.0, pp. 1-86, 3rd Generation Partnership Project, Valbonne, France (Jun. 2018).

"Authentication between API invoker and AEF upon the service invocation," 3GPP TSG SA WG3 (Security) Meeting #91, Belgrade (Serbia), S3-181370 revision of S3-18xabc, Total 2 pages, 3rd Generation Partnership Project, Valbonne, France (Apr. 16-20, 2018).

"3rd Generation Partnership Project; Technical Specification Group Services and System Aspects; System Architecture for the 5G System; Stage 2 (Release 15)," 3GPP TS 23.501 V15.2.0, pp. 1-217, 3rd Generation Partnership Project, Valbonne, France (Jun. 2018).

"3rd Generation Partnership Project; Technical Specification Group Services and System Aspects; Procedures for the 5G System; Stage 2 (Release 15)," 3GPP TS 23.502 V15.2.0, pp. 1-308, 3rd Generation Partnership Project, Valbonne, France (Jun. 2018).

* cited by examiner

COMMUNICATION METHOD AND APPARATUS

CROSS-REFERENCE TO RELATED APPLICATIONS

This application is a continuation of U.S. patent application Ser. No. 17/137,029, filed on Dec. 29, 2020, which a continuation of International Patent Application No. PCT/CN2019/093866, filed on Jun. 28, 2019, which claims priority to Chinese Patent Application No. 201810703100.9, filed on Jun. 30, 2018. All of the afore-mentioned patent applications are hereby incorporated by reference in their entireties.

TECHNICAL FIELD

Embodiments of this application relate to the field of communications technologies, and in particular, to a communication method and an apparatus.

BACKGROUND

A traditional cellular network architecture can provide only communications services of a same type for different terminal types and service types, and this is difficult to meet differentiated communication requirements brought by digital transformation. To provide a differentiated communications service, in a fifth generation (5G) mobile communications system, a network is abstracted as a plurality of network slices (NS), one network slice can meet a type of communications service requirement, and the 5G mobile communications system may include a large quantity of network slices that meet different communications services.

A northbound API opened by a common application interface framework (common API framework, CAPIF) to an API invoker network element may correspond to one or more southbound APIs, and the southbound APIs are usually provided by network elements that are in a same network slice. Usually, an application service provider or an application signs a contract with a mobile communications network operator for leasing one or more network slices. Information about the signed contract includes a correspondence between the application service provider or the application and network slice information. The contract information may be stored in a policy control function (PCF) or a unified data repository (UDR).

Currently, in the CAPIF, because the API invoker network element does not determine the network slice information corresponding to the application, an API found by the API invoker network element may not be provided by a network slice corresponding to the application, and a problem that an API search result may be incorrect exists.

SUMMARY

In view of this, this application provides a communication method and an apparatus, to determine a network slice corresponding to an application, so that an API invoker network element can accurately search the network slice corresponding to the application for an API.

According to a first aspect, an embodiment of this application provides a communication method. The method includes: A CCF network element first sends reference information of an application to a first network element. The reference information of the application includes at least one of an API invoker network element identifier, an ASP identifier, an application identifier, and an access point name APN. Therefore, the first network element determines, based on the reference information of the application, network slice information corresponding to the application, and then sends the network slice information to the CCF network element.

In the method, the first network element may be an AEF network element, an APF network element, or a PCF network element. According to the method, the CCF network element can obtain the network slice information from the first network element based on the reference information of the application, and subsequently, the CCF network element can accurately search a network slice corresponding to the network slice information for an API.

In a possible implementation, the CCF network element first receives an API publish request message from an API publishing network element. The API publish request message includes a correspondence between the network slice and API information. The CCF network element locally stores the correspondence. In this way, when subsequently receiving an API discover request message that is from the API invoker network element, the CCF network element determines, based on the network slice information, the API information corresponding to the network slice information.

In a possible implementation, the CCF network element receives an API discover request message from the API invoker network element. Because the API discover request message includes an API inquiry parameter and the reference information of the application, and the API inquiry parameter includes at least one of an API type, a transfer protocol type, and interface information, the CCF network element determines, based on the correspondence between the network slice information and the API, the network slice information, and the API inquiry parameter, target API information corresponding to the application. An API corresponding to the target API information is invoked by the API invoker network element. According to the method, when the API invoker network element searches for the API, the CCF network element accurately searches for, based on the network slice information, the locally stored correspondence between the network slice information and the API, and the API inquiry parameter, the API from the network slice corresponding to the network slice information.

In a possible implementation, after determining the target API information, the CCF network element sends the network slice information and the target API information to the API invoker network element. In this way, the API invoker network element may subsequently invoke a network element that is in the network slice based on the network slice information and the target API information, to obtain a network function service.

In a possible implementation, when the CCF network element does not store the network slice information corresponding to the reference information of the application, the CCF network element may send the reference information of the application to the first network element: otherwise, the CCF network element directly searches locally for the network slice information corresponding to the reference information of the application. If the CCF network element directly searches locally for the network slice information corresponding to the reference information of the application, the network slice information can be found in a timely manner, and a communication interaction latency can be reduced to some extent.

According to a second aspect, an embodiment of this application provides another communication method. The method includes: An AEF network element sends reference information of an application to a policy control function PCF network element. The reference information of the application includes at least one of an API invoker network element identifier, an ASP identifier, an application identifier, and an APN. Therefore, the PCF network element determines, based on the reference information of the application, network slice information corresponding to the reference information of the application, and then sends the network slice information to the AEF network element. According to the method, the AEF network element may obtain the network slice information from the PCF network element based on the reference information of the application.

In a possible implementation, the AEF network element receives a first invoking request message from an API invoker network element. The first invoking request message includes the reference information of the application and target API information requested to be invoked. After receiving the network slice information, the AEF network element sends a network function discovery request message to an NRF network element. Because the network function discovery request message includes the network slice information, the NRF network element may determine, based on the target API information requested to be invoked and the network slice information that are in the first invoking request message, target network element information corresponding to the target API information, and then send a network function discovery response message to the AEF network element. The network function discovery response message includes target network element information corresponding to the network slice information and the target API information requested to be invoked. According to the method, the AEF network element uses the network slice information obtained from the PCF network element, to accurately search for, on a network slice corresponding to the network slice information, the target network element information corresponding to the target API information.

In a possible implementation, after receiving the network function discovery response message from the NRF network element, the AEF network element sends, based on the first invoking request message, a second invoking request message to a target network element corresponding to the target network element information. The second invoking request message also includes the API information. After receiving the second invoking request message, the target network element invokes an API corresponding to the API information, and generates an invoking result. The AEF network element receives the invoking result of the API from the target network element, and then sends the invoking result to the API invoker network element. In this way, the target network element may invoke the API and generate the invoking result, and the AEF network element obtains the invoking result from the target network element through the NRF network element, so as to invoke the API corresponding to the target API information.

In a possible implementation, when the AEF network element does not store the network slice information corresponding to the reference information of the application, the AEF network element sends the reference information of the application to the PCF network element: otherwise, the AEF network element directly finds the network slice information from the AEF network element. If the AEF network element directly searches locally for the network slice information corresponding to the reference information of the application, the network slice information can be found in a timely manner, and a communication interaction latency can be reduced to some extent.

According to a third aspect, this application further provides a communication method, and the method may be performed by a first network element. The method includes: The first network element receives reference information of an application from a CCF network element. Therefore, the first network element sends, based on the reference information of the application, network slice information corresponding to the application to the CCF network element.

In other words, the first network element determines, based on the reference information of the application, the network slice information corresponding to the application, and then sends the network slice information to the CCF network element. The first network element may be an AEF network element, an APF network element, or a PCF network element. The reference information of the application includes at least one of an API invoker network element identifier, an ASP identifier, an application identifier, and an access point name APN.

According to the method, the CCF network element can obtain the network slice information from the first network element based on the reference information of the application, and subsequently, the CCF network element can accurately search a network slice corresponding to the network slice information for an API.

According to a fourth aspect, this application further provides a communication method, and the method may be performed by a PCF network element. The method includes: The PCF network element receives reference information of an application from an AEF network element. The PCF network element sends, based on the reference information of the application, network slice information corresponding to the application to the AEF network element.

The reference information of the application includes at least one of an API invoker network element identifier, an ASP identifier, an application identifier, and an APN. According to the method, the PCF network element may determine the network slice information based on the reference information that is of the application and that is obtained from the AEF network element. In this way, the AEF network element may find target network element information based on the network slice information returned by the PCF network element and target API information requested to be invoked, so that the API invoker network element receives execution results of the AEF network element and a target network element from the AEF network element.

According to a fifth aspect, this application further provides a communication method, and the method may be performed by an AEF network element. The method includes: The AEF network element receives a first invoking request message from an API invoker network element. The first invoking request message includes reference information of an application. Therefore, the AEF network element determines, based on the first invoking request message, network slice information corresponding to the reference information of the application. The reference information of the application may include at least one of an API invoker network element identifier, an ASP identifier, an application identifier, and an APN. According to the method, the AEF network element may accurately search a network slice corresponding to the network slice information for an API. In addition, directly searching locally for the network slice information corresponding to the reference information of the application helps find the network slice information in a timely manner, and can reduce a communication interaction latency to some extent.

In a possible implementation, the first invoking request message further includes target API information requested to be invoked. The AEF network element sends a network function discovery request message to an NRF network element. Because the network function discovery request message includes the network slice information, the NRF network element may determine, based on the network slice information and the target API information requested to be invoked, target network element information corresponding to the network slice information and the target API information, and then send a network function discovery response message to the AEF network element. The network function discovery response message includes the target network element information corresponding to the network slice information and the target API information requested to be invoked.

According to the method, the AEF network element may obtain the network slice information from the PCF network element based on the reference information of the application, and then may find the target network element information based on the network slice information and the target API information requested to be invoked.

In a possible implementation, after receiving the network function discovery response message from the NRF network element, the AEF network element sends, based on the first invoking request message, a second invoking request message to a target network element corresponding to the target network element information. The second invoking request message also includes the API information. After receiving the second invoking request message, the target network element invokes an API corresponding to the API information, and generates an invoking result. The AEF network element receives the invoking result of the API from the target network element, and then sends the invoking result to the API invoker network element.

In this way, the target network element may invoke the API and generate the invoking result, and the AEF network element obtains the invoking result from the target network element through the NRF network element, so as to invoke the API corresponding to the target API information.

According to a sixth aspect, this application further provides a communication method, and the method may be performed by an AEF network element. The method includes: The AEF network element receives information about a target area of an application service and network function service information from an API invoker network element, and then the AEF network element determines, based on the information about the target area of the application service and information about a service area of a network element corresponding to the network function service information, a target network element that provides, for the API invoker network element, a network function service corresponding to the network function service information.

According to the method, the AEF network element can accurately find the target network element based on the service area of the application service of the API invoker network element and the information about the service area of the network element corresponding to the network function service information, so that the target network element invokes an API and generates an invoking result, and provides the network function service for the API invoker network element.

In a possible implementation, the AEF network element determines, based on the network function service information, the network element corresponding to the network function service information.

Further, in a possible implementation, the AEF network element may determine, from the network element corresponding to the network function service information, a network element whose service area at least partially overlaps the target area of the application service, and determine the network element as the target network element.

In addition, the AEF network element may alternatively determine a network element that is in the network element corresponding to the network function service information and whose service area completely overlaps the target area of the application service as the target network element. According to the method, the target network element determined by the AEF network element may accurately provide, for the API invoker network element, the network function service corresponding to the application service.

In a possible implementation, the AEF network element may further first obtain the network slice information corresponding to the application service, and then determine the target network element based on the network slice information, the information about the service area of the network element corresponding to the network function service information, and the information about the target area of the application service. According to the method, the target network element determined by the AEF network element may accurately provide, for the API invoker network element, the network function service corresponding to the application service.

According to a seventh aspect, this application further provides a communication method, and the method may be performed by an NRF network element. The method includes: The NRF network element receives, from an AEF network element, information about a target area of an application service and network function service information corresponding to the application service, and then the NRF network element determines a target network element based on the information about the target area of the application service and information about a service area of a network element corresponding to the network function service information.

According to the method, the target network element determined by the NRF network element may accurately provide, for an API invoker network element, a network function service corresponding to the application service.

In a possible design, the NRF network element determines, based on the network function service information corresponding to the application service, the network element corresponding to the network function service information.

Further, in a possible implementation, the NRF network element may determine, from the network element corresponding to the network function service information, a network element whose service area at least partially overlaps the target area of the application service as the target network element. According to the method, the NRF network element may determine the target network element, to accurately provide the network function service for the API invoker network element.

According to an eighth aspect, this application provides an apparatus. The apparatus may be a CCF network element or a chip in an entity in which a CCF network element is located. The apparatus has a function of implementing embodiments of the first aspect. The function may be implemented by hardware, or may be implemented by hardware by executing corresponding software. The hardware or the software includes one or more modules corresponding to the foregoing function.

In a possible design, when the apparatus is a CCF network element, the apparatus includes a processing unit and a communications unit. The processing unit may be, for example, a processor, the communications unit may be, for example, a transceiver, and the transceiver includes a radio frequency circuit. Optionally, the CCF network element further includes a storage unit, and the storage unit may be, for example, a memory. When the CCF network element includes a storage unit, the storage unit stores a computer executable instruction, the processing unit is connected to the storage unit, and the processing unit executes the computer executable instruction stored in the storage unit, so that the CCF network element performs the communication method according to any one of implementations of the first aspect.

In another possible design, when the apparatus is a chip in an entity in which a CCF network element is located, the chip includes a processing unit and a communications unit. The processing unit may be, for example, a processor, and the communications unit may be, for example, an input/output interface, a pin, or a circuit. The processing unit may execute the computer executable instruction stored in the storage unit, so that the communication method according to any one of implementations of the first aspect is performed. Optionally, the storage unit is a storage unit in the chip, for example, a register or a cache, or the storage unit may alternatively be a storage unit that is in the target service entity and that is outside the chip, for example, a read-only memory (ROM), another type of static storage device that can store static information and an instruction, or a random access memory (RAM).

The processor mentioned in any of the foregoing designs may be a general-purpose central processing unit (CPU), a microprocessor, an application-specific integrated circuit (ASIC), or one or more integrated circuits for controlling program executions of the communication method according to the first aspect.

According to a ninth aspect, this application provides an apparatus. The apparatus may be an AEF network element, or a chip in an entity in which an AEF network element is located. The apparatus has a function of implementing embodiments of the second aspect, or a function of implementing embodiments of the fifth aspect, or a function of implementing embodiments of the sixth aspect. The function may be implemented by hardware, or may be implemented by hardware by executing corresponding software. The hardware or the software includes one or more modules corresponding to the foregoing function.

In a possible design, when the apparatus is an AEF network element, the apparatus includes a processing unit and a communications unit. The processing unit may be, for example, a processor, the communications unit may be, for example, a transceiver, and the transceiver includes a radio frequency circuit. Optionally, the AEF network element further includes a storage unit, and the storage unit may be, for example, a memory. When the AEF network element includes a storage unit, the storage unit stores a computer executable instruction, the processing unit is connected to the storage unit, and the processing unit executes the computer executable instruction stored in the storage unit, so that the AEF network element performs the communication method according to any one of implementations of the second aspect or the function of implementing embodiments of the fifth aspect.

In another possible design, when the apparatus is a chip in an entity in which an AEF network element is located, the chip includes a processing unit and a communications unit. The processing unit may be, for example, a processor, and the communications unit may be, for example, an input/output interface, a pin, or a circuit. The processing unit may execute the computer executable instruction stored in the storage unit, so that the communication method according to any one of implementations of the first aspect is performed. Optionally, the storage unit is a storage unit in the chip, for example, a register or a cache, or the storage unit may alternatively be a storage unit that is in the target service entity and that is outside the chip, for example, a read-only memory (ROM), another type of static storage device that can store static information and an instruction, or a random access memory (RAM).

The processor mentioned in any of the foregoing designs may be a general-purpose CPU, a microprocessor, an ASIC, or one or more integrated circuits for controlling program executions of the communication method according to the second aspect.

According to a tenth aspect, this application provides an apparatus. The apparatus may be a first network element, or a chip in an entity in which the first network element is located. The first network element may be an AEF network element, an APF network element, or a PCF network element. The apparatus has a function of implementing embodiments of the third aspect. The function may be implemented by hardware, or may be implemented by hardware by executing corresponding software. The hardware or the software includes one or more modules corresponding to the foregoing function.

In a possible design, when the apparatus is an AEF network element, an APF network element, or a PCF network element, the apparatus includes a processing unit and a communications unit. The processing unit may be, for example, a processor, the communications unit may be, for example, a transceiver, and the transceiver includes a radio frequency circuit. Optionally, the first network element further includes a storage unit, and the storage unit may be, for example, a memory. When the first network element includes a storage unit, the storage unit stores a computer executable instruction, the processing unit is connected to the storage unit, and the processing unit executes the computer executable instruction stored in the storage unit, so that the first network element performs the communication method according to any one of implementations of the third aspect.

In another possible design, when the apparatus is a chip in an entity in which a first network element is located, the chip includes a processing unit and a communications unit. The processing unit may be, for example, a processor, and the communications unit may be, for example, an input/output interface, a pin, or a circuit. The processing unit may execute the computer executable instruction stored in the storage unit, so that the communication method according to any one of implementations of the first aspect is performed. Optionally, the storage unit is a storage unit in the chip, for example, a register or a cache, or the storage unit may alternatively be a storage unit that is in the target service entity and that is outside the chip, for example, a read-only memory (ROM), another type of static storage device that can store static information and an instruction, or a random access memory (RAM).

The processor mentioned in any of the foregoing designs may be a general-purpose CPU, a microprocessor, an ASIC, or one or more integrated circuits for controlling program executions of the communication method according to the third aspect.

According to an eleventh aspect, this application provides an apparatus. The apparatus may be a PCF network element or a chip in an entity in which a PCF network element is located. The apparatus has a function of implementing embodiments of the fourth aspect. The function may be implemented by hardware, or may be implemented by hardware by executing corresponding software. The hardware or the software includes one or more modules corresponding to the foregoing function.

In a possible design, when the apparatus is a PCF network element, the apparatus includes a processing unit and a communications unit. The processing unit may be, for example, a processor, the communications unit may be, for example, a transceiver, and the transceiver includes a radio frequency circuit. Optionally, the PCF network element further includes a storage unit, and the storage unit may be, for example, a memory. When the PCF network element includes a storage unit, the storage unit stores a computer executable instruction, the processing unit is connected to the storage unit, and the processing unit executes the computer executable instruction stored in the storage unit, so that the PCF network element performs the communication method according to any one of implementations of the fourth aspect.

In another possible design, when the apparatus is a chip in an entity in which a PCF network element is located, the chip includes a processing unit and a communications unit. The processing unit may be, for example, a processor, and the communications unit may be, for example, an input/output interface, a pin, or a circuit. The processing unit may execute the computer executable instruction stored in the storage unit, so that the communication method according to any one of implementations of the first aspect is performed. Optionally, the storage unit is a storage unit in the chip, for example, a register or a cache, or the storage unit may alternatively be a storage unit that is in the target service entity and that is outside the chip, for example, a read-only memory (ROM), another type of static storage device that can store static information and an instruction, or a random access memory (RAM).

The processor mentioned in any of the foregoing designs may be a general-purpose CPU, a microprocessor, an ASIC, or one or more integrated circuits for controlling program executions of the communication method according to the fourth aspect.

According to a twelfth aspect, this application provides an apparatus. The apparatus may be an NRF network element or a chip in an entity in which an NRF network element is located. The apparatus has a function of implementing embodiments of the seventh aspect. The function may be implemented by hardware, or may be implemented by hardware by executing corresponding software. The hardware or the software includes one or more modules corresponding to the foregoing function.

In a possible design, when the apparatus is an NRF network element, the apparatus includes a processing unit and a communications unit. The processing unit may be, for example, a processor, the communications unit may be, for example, a transceiver, and the transceiver includes a radio frequency circuit. Optionally, the NRF network element further includes a storage unit, and the storage unit may be, for example, a memory. When the NRF network element includes a storage unit, the storage unit stores a computer executable instruction, the processing unit is connected to the storage unit, and the processing unit executes the computer executable instruction stored in the storage unit, so that the NRF network element performs the communication method according to any one of implementations of the seventh aspect.

In another possible design, when the apparatus is a chip in an entity in which an NRF network element is located, the chip includes a processing unit and a communications unit. The processing unit may be, for example, a processor, and the communications unit may be, for example, an input/output interface, a pin, or a circuit. The processing unit may execute the computer executable instruction stored in the storage unit, so that the communication method according to any one of implementations of the first aspect is performed. Optionally, the storage unit is a storage unit in the chip, for example, a register or a cache, or the storage unit may alternatively be a storage unit that is in the target service entity and that is outside the chip, for example, a read-only memory (ROM), another type of static storage device that can store static information and an instruction, or a random access memory (RAM).

The processor mentioned in any of the foregoing designs may be a general-purpose CPU, a microprocessor, an ASIC, or one or more integrated circuits for controlling program executions of the communication method according to the seventh aspect.

According to a thirteenth aspect, this application further provides a computer-readable storage medium. The computer-readable storage medium stores an instruction; and when the instruction is run on a computer, the computer is enabled to perform the method according to the foregoing aspects.

According to a fourteenth aspect, this application further provides a computer program product including an instruction; and when the computer program product runs on a computer, the computer is enabled to perform the method in the foregoing aspects.

According to a fifteenth aspect, this application further provides a communications system, where the system includes a CCF network element and a first network element. The CCF network element is configured to send reference information of an application to the first network element. The first network element is configured to send, based on the reference information of the application, network slice information corresponding to the application to the CCF network element. The CCF network element is further configured to receive, from the first network element, the network slice information corresponding to the application.

In the system, the first network element may be an AEF network element, an APF network element, or a PCF network element. According to the system, the CCF network element can obtain the network slice information from the first network element based on the reference information of the application, and subsequently, the CCF network element can accurately search a network slice corresponding to the network slice information for an API.

According to a sixteenth aspect, this application further provides a communications system, where the system includes an AEF network element and a PCF network element. The AEF network element is configured to send reference information of an application to the PCF network element. The PCF network element is configured to send, based on the received reference information of the application, network slice information corresponding to the application to the AEF network element. The AEF network element is further configured to receive, from the PCF network element, the network slice information corresponding to the application.

According to the system, the AEF network element may obtain the network slice information from the PCF network element based on the reference information of the application.

Such aspects or other aspects of this application are clearer and more comprehensible in descriptions of the following embodiments.

DESCRIPTION OF EMBODIMENTS

The following further describes this application in detail with reference to the accompanying drawings.

Embodiments of this application may be applied to various mobile communications systems, for example, a new radio (NR) system, a global system for mobile communications (GSM), a code division multiple access (CDMA) system, a wideband code division multiple access (WCDMA) system, a general packet radio service (GPRS) system, a long term evolution (long term LTE) system, an advanced long term evolution (LTE-A) system, a universal mobile telecommunications system (UMTS), an evolved long term evolution (eLTE) system, and a fifth generation (5G) mobile communications system.

Figure 1:
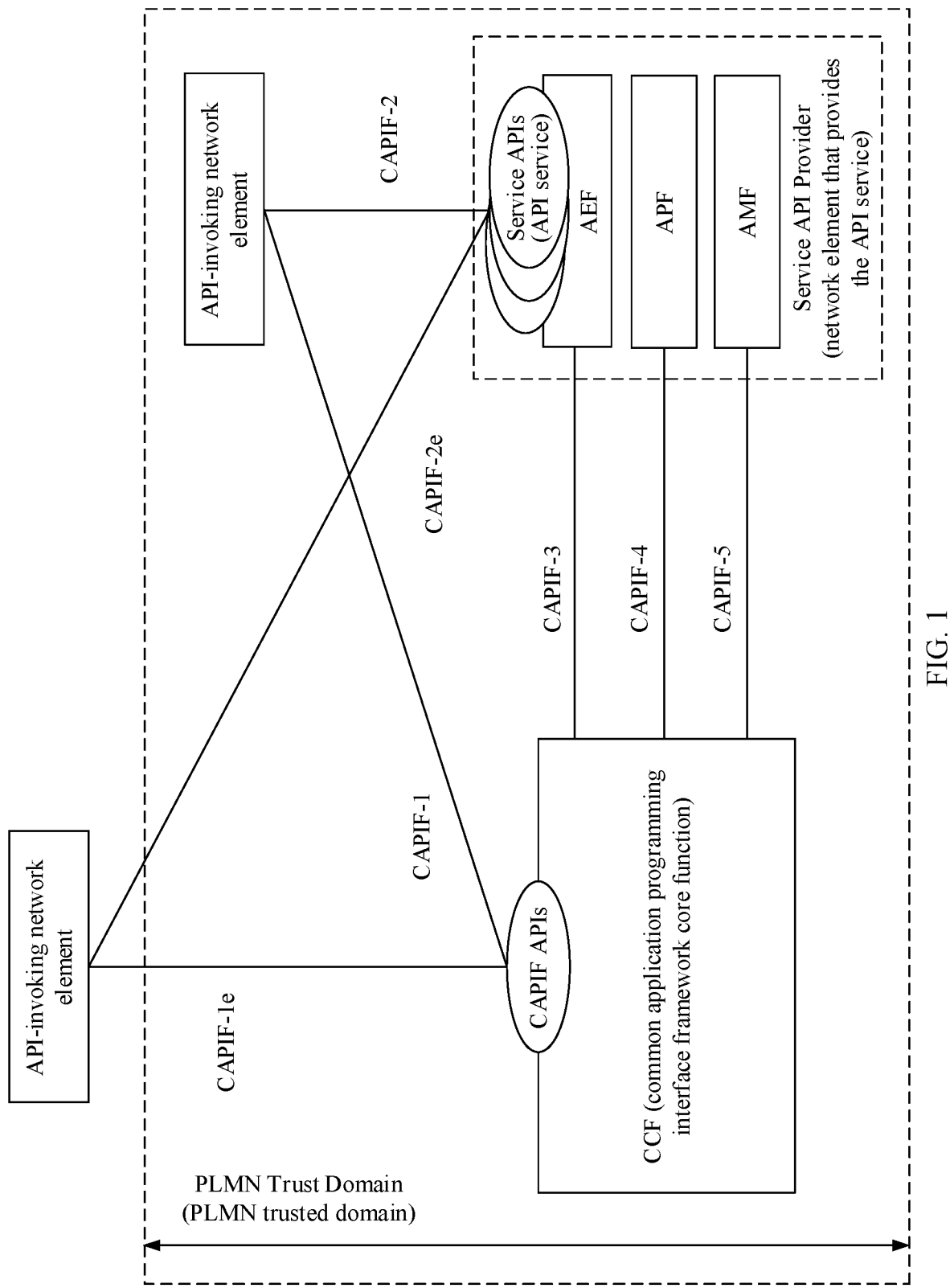
FIG. 1 is an architectural diagram of a common API system according to an embodiment of this application.

FIG. 1 is a schematic diagram of a possible applicable system architecture according to this application. The schematic diagram is a framework diagram of a common application programming interface (API). The framework diagram includes an API invoker API invoker network element 101 and a common application programming interface framework core function (CAPIF core function. CCF) network element 102, an application programming interface exposure function (API exposing function. AEF) network element 103, an application programming interface publishing function (API publishing function. APF) network element 104, and an application programming interface management function (API management function. AMF) network element 105.

A CAPIF-1 is a reference point between an API invoker network element and a CCF, and is used by an API invoker network element that is in a PLMN trusted domain to search for an API, authenticate with the CCF, and obtain authorization. The CAPIF-1 supports the following functions: authenticating the API invoker network element based on an identifier and a security credential of the API invoker network element: performing two-way authentication between the API invoker network element and the CCF: providing an API invoker entity with authorization for accessing the API: discovering API information; and the like.

A CAPIF-1e is used by an API invoker network element that is outside the PLMN trusted domain to search for the API, authenticate with the CCF, and obtain authorization. The CAPIF-1e provides the same functions as the CAPIF-1.

A CAPIF-2 is a reference point between the API invoker entity and an API exposure function network element, and is used by the API invoker entity that is in the PLMN trusted domain to perform API communication. The CAPIF-2 supports the following functions: authenticating the API invoker network element based on the identifier and the security credential of the API invoker network element: performing authorization verification when the API invoker network element accesses the API: invoking the API; and the like.

A CAPIF-2e is used by the API invoker entity that is in the PLMN trusted domain to perform the API communication. The CAPIF-2e provides the same functions as the CAPIF-2.

A CAPIF-3 is a reference point between the API exposure function network element and the CCF, and is used to perform access-policy-related control and the API communication initiated by the API invoker network element. The CAPIF-3 supports the following functions: supporting the API exposure function network element to authenticate the API invoker network element based on the identifier and the security credential of the API invoker network element; supporting the API exposure function network element to provide authorization for the API invoker network element before the API invoker network element accesses the API: supporting to perform authorization verification of the API exposure function network element when the API invoker network element accesses the API: supporting the API exposure function network element to control API access based on a policy configured by a PLMN operator: supporting the API exposure function network element to record logs of the API invoker: supporting the API exposure function network element to charge for the API invoker; and the like.

A CAPIF-4 is a reference point between an API publishing function network element and the CCF, and is used to publish the API information. The CAPIF-4 supports the following API publishing functions.

A CAPIF-5 is a reference point between an API management function network element and the CCF, and is used to manage the API and API invoker network element information. The CAPIF-5 supports the following functions: supporting the API management function network element to access logs of the API invoker: supporting the API management function network element to monitor an API invoker event: supporting the API invoker network element to configure information about the API invoker network element on the CCF, to support registration of the API invoker network element: supporting the API management function network element to configure the policy on the CCF, for example, configure an upper limit of the API invoker and temporarily disable the API for a period of time: supporting an API provider to monitor an API status; and the like.

The API invoker network element 101 is usually a third-party application function entity software program that signs a service agreement with the PLMN operator, and a third-party application may be, for example, a machine-to-machine (M2M) application, an internet-of-things (IoT) application, or a vehicle-to-everything (V2X) application. Such applications may run in a terminal device, or may run in a network device. In addition, the API invoker network element may further be an application function (AF) network element. The API invoker network element and the API provider (for example, the PLMN operator) that provides the API may be in a same trusted domain, or may belong to different trusted domains. The API invoker network element 101 supports the following functions: supporting authentication of the API invoker network element, and authentication of the identifier and other information of the API invoker network element: supporting mutual authentication between the API invoker network element and the CAPIF: obtaining authorization before accessing the API: searching for and invoking the API; and the like.

The CCF network element 102 supports the following functions: authenticating the API invoker network element based on the identifier and the other information of the API invoker network element: supporting mutual authentication between the CCF network element 102 and the API invoker network element: providing authorization for the API invoker network element before the API invoker network element accesses the API: publishing, storing, and searching for the API; controlling the API access based on the policy of the PLMN operator; storing the logs of the API invoker and providing the logs for an authorized entity: performing charging based on the API logs: checking the API invoker: registering the API invoker network element: storing the configuration policy: supporting audit of the invoking and the logs; and the like.

The AEF network element 103 provides the API, is also an entry for the API invoker network element 101 to invoke the API, and supports the following functions: authenticating the API invoker network element based on the API invoker network element identifier and other information provided by the CCF network element: acknowledging the authorization provided by the CCF network element; and synchronizing the API logs to the CCF.

The APF network element 104 provides an API publishing function, so that the API invoker network element can discover the API.

The AMF network element 105 provides API management, and supports the following functions: auditing the logs that are of the API invoker and that are provided by the CCF network element: monitoring the event reported by the CCF network element: configuring the policy of the API provider for the API: checking the API status: registering the API invoker network element; and the like.

In the LTE system, the AEF network element 103 may be deployed in a service capability exposure function (SCEF) network element. The CCF 102 may be deployed in an independent network entity. Alternatively, the CCF 102 and an entity that is in an API service provider (for example, the AEF, the APF, or the AMF) may be deployed together in the SCEF.

In addition, in the 5G mobile communications system, the AEF network element 103 may be deployed in the network exposure function (NEF) network element. The CCF network element 102 may be deployed in an independent network entity. Alternatively, the CCF 102 and the network element that is in the API service provider (for example, the AEF, the APF, or the AMF) may be deployed together in the NEF.

Network elements in the embodiments of this application may be independent physical devices, or may be logical function modules. Different logical function modules may be located on a same physical device, or may be located on different physical devices. This is not limited.

It should be noted that the network architecture and the application scenario described in this application are intended to describe the technical solutions in this application more clearly, but constitute no limitation on the technical solutions provided in this application. A person of ordinary skill in the art may learn that the technical solutions provided in this application are also applicable to a similar technical problem as the network architecture evolves and a new service scenario emerges.

Currently; in the prior art, an API invoker network element cannot determine a network slice that provides an API searched by the API invoker network element, or a network slice that provides an API invoked by the API invoker network element. Therefore, a service provided by a corresponding network slice cannot be invoked. To resolve the foregoing problem, the embodiments of this application provide a communication method, so that in the system architecture shown in FIG. 1, a CCF network element can determine a network slice that provides an API searched by an API invoker network element, or an AEF network element can determine a network slice that provides an API invoked by an API invoker network element.

Figure 2:
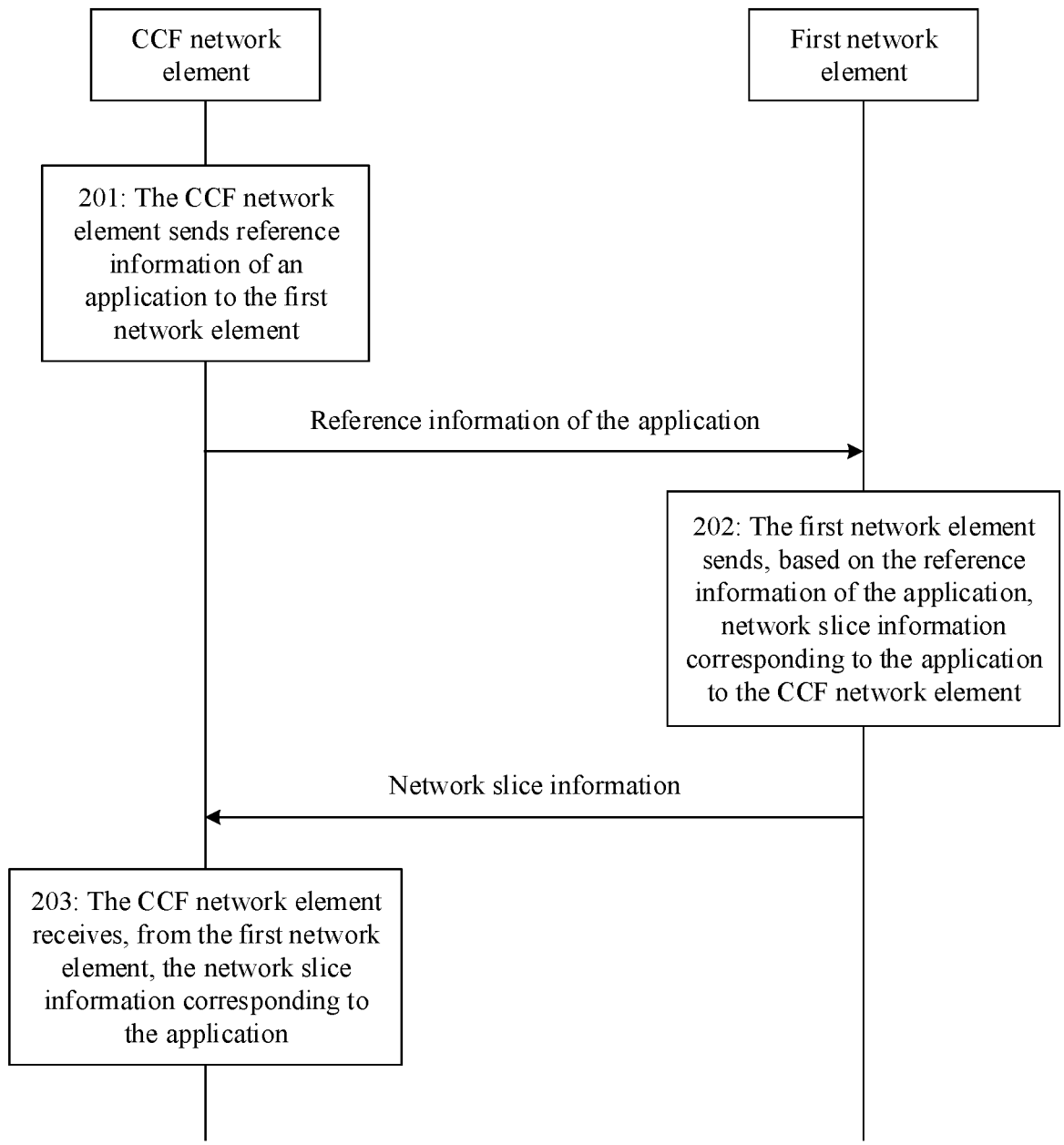
FIG. 2 is a schematic diagram of a communication method according to an embodiment of this application.
Figure 3A:
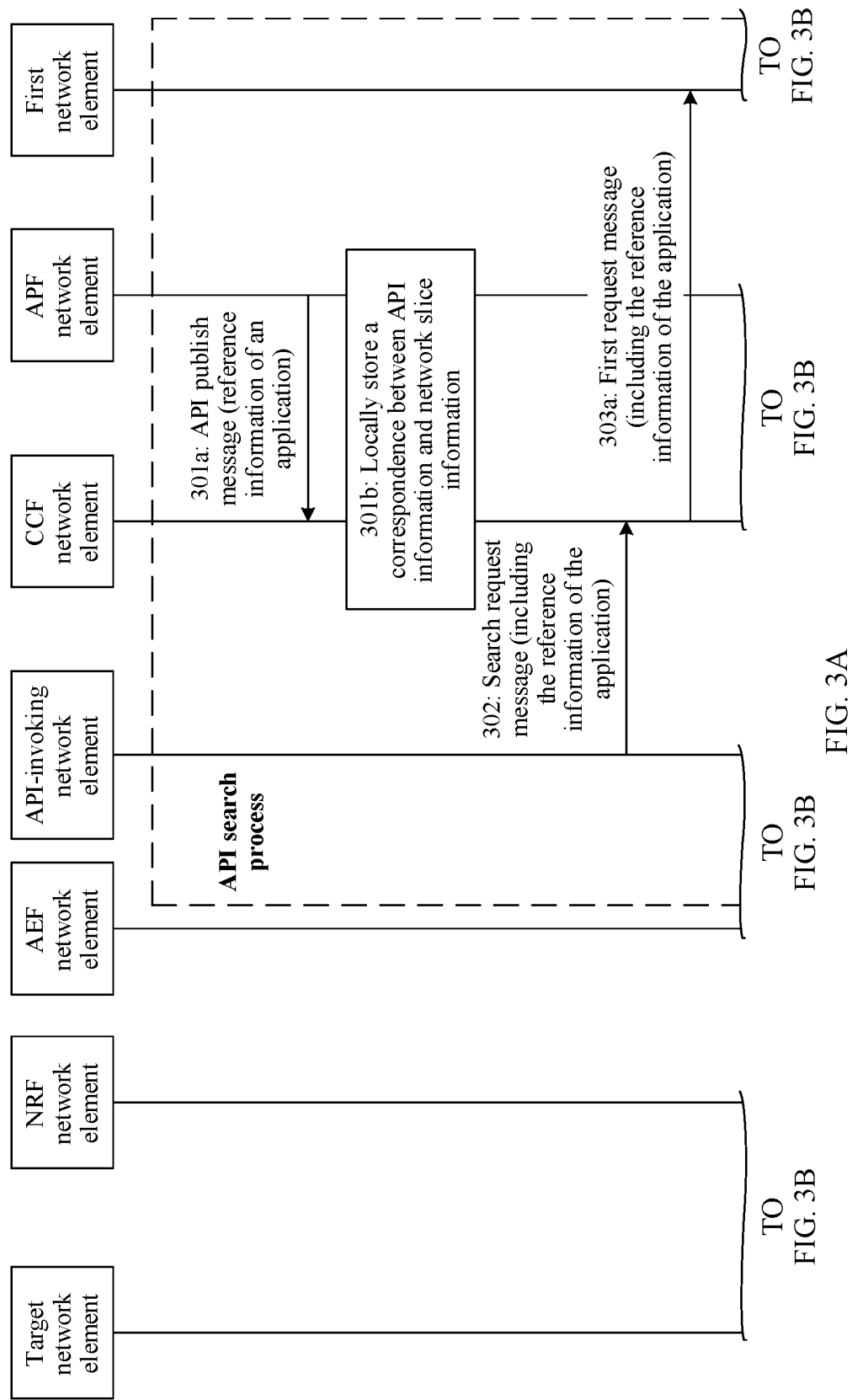
FIG. 3A, FIG. 3B, FIG. 3C, and FIG. 3D are a schematic diagram of an API discovery procedure and an API invoker procedure according to an embodiment of this application.
Figure 3B:
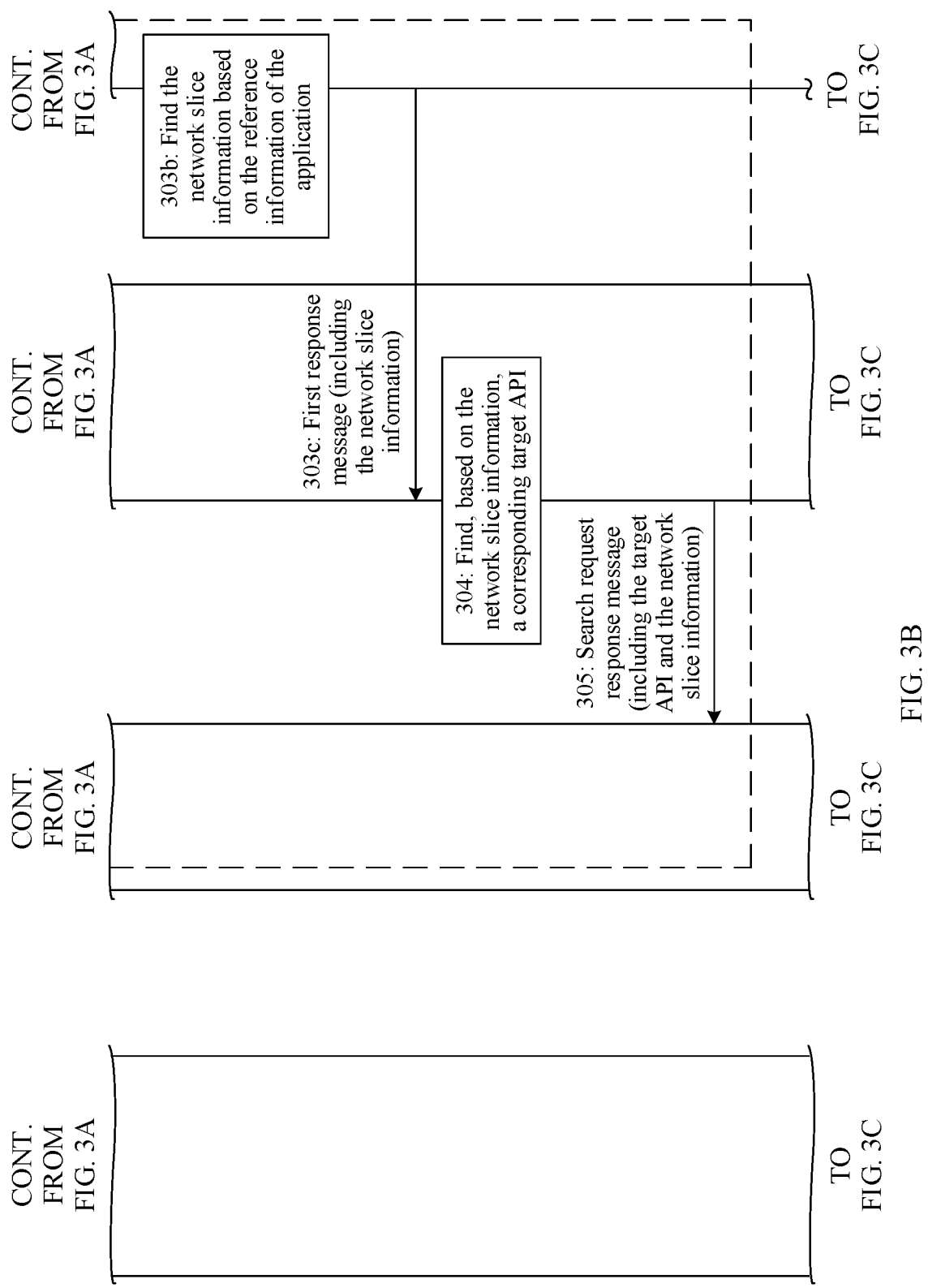
Figure 3C:
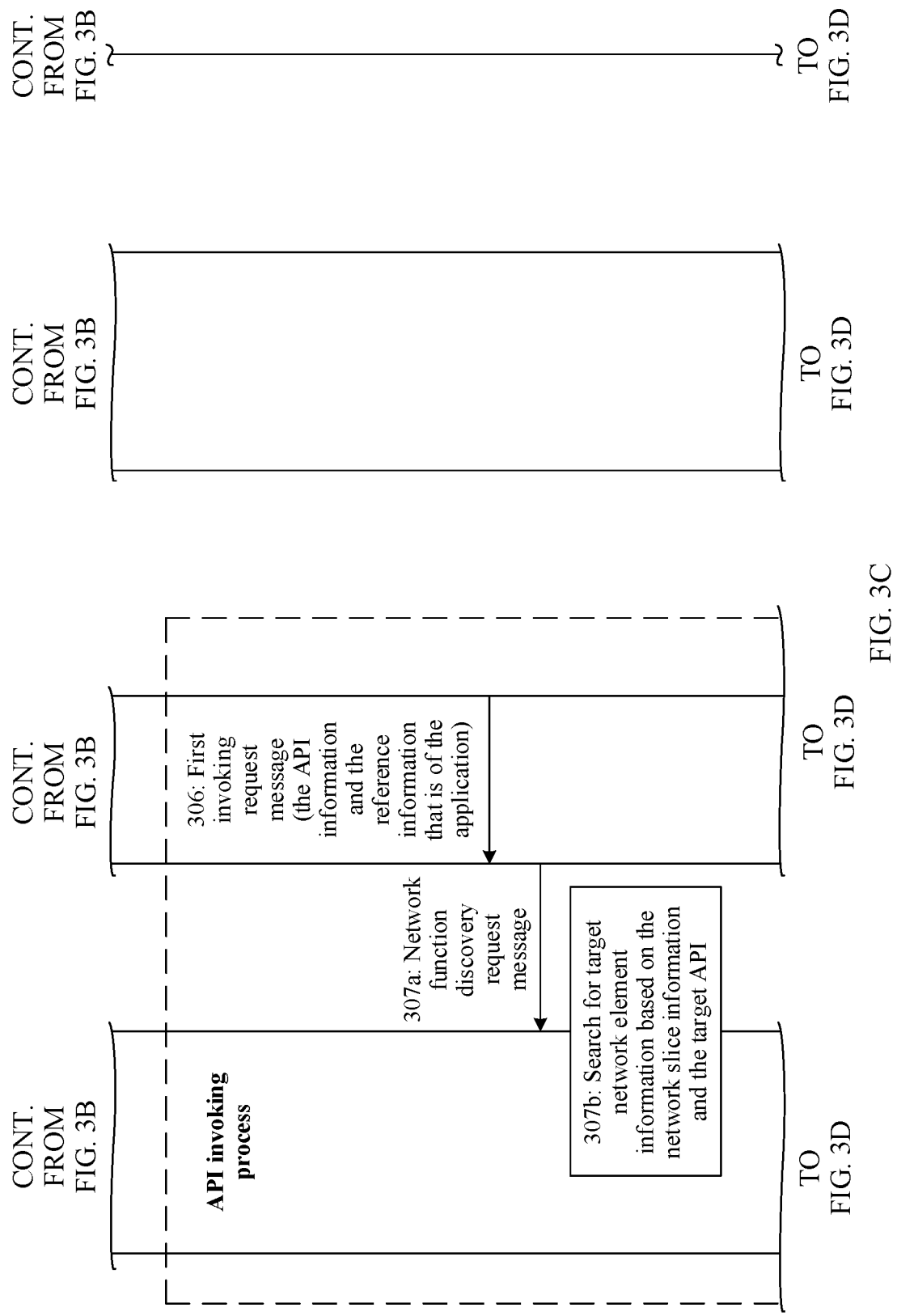
Figure 3D:
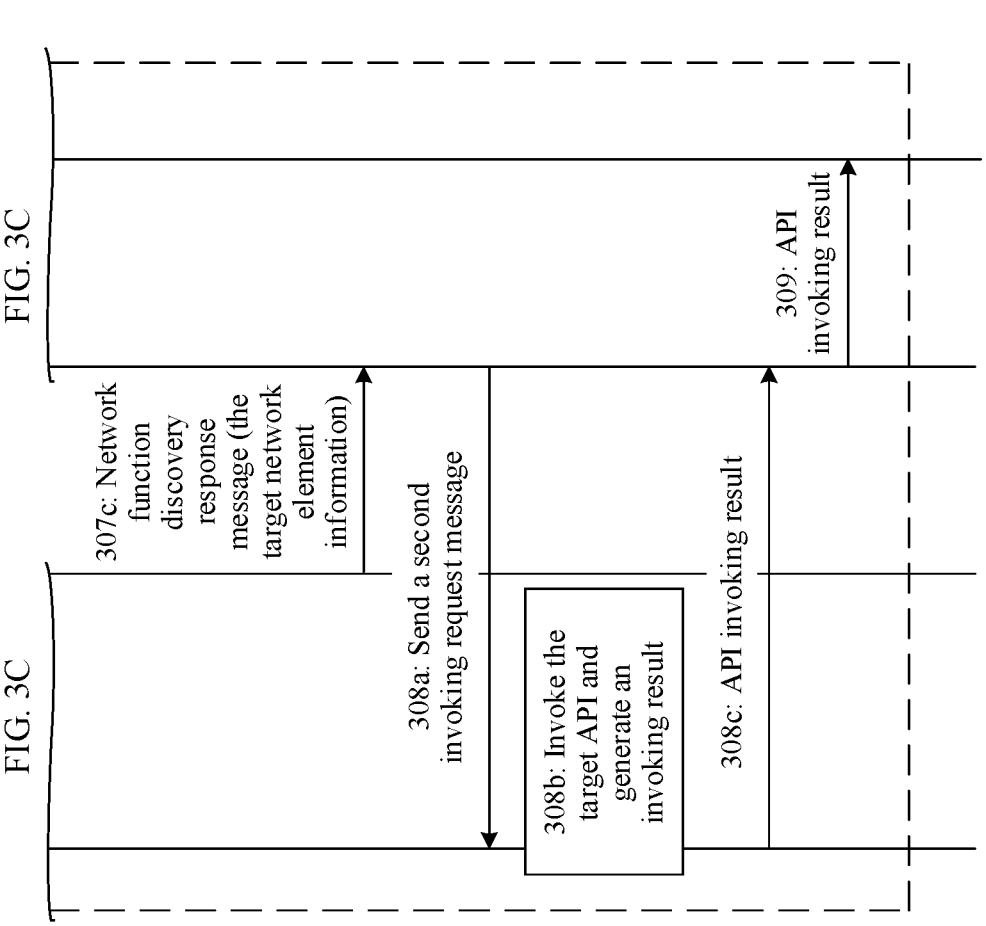

FIG. 2 is a schematic diagram of a communication method according to this application. The method may be used by a CCF network element to determine a network slice that provides an API searched for by an API invoker network element. The following describes the method.

Step 201: The CCF network element sends reference information of an application to a first network element.

The CCF network element may send the reference information of the application to the first network element by sending a message. For example, a first request message sent by the CCF to the first network element includes the reference information of the application. The first request message may be a slice information discovery request (Slice info discover request) message or a slice information inquiry request (Slice info inquiry request) message. The CCF network element may alternatively send the reference information of the application to the first network element by invoking an API. For example, there is an API (in 5G, the API is also referred to as a network function service (NF service)) between the CCF network element and the first network element, and the CCF network element invokes the API to transmit the parameter information, namely, the reference information of the application, to the first network element.

The reference information of the application is information related to the application, and the first network element may determine, based on the reference information of the application, network slice information corresponding to the application. The reference information of the application may include at least one of an API invoker network element identifier, an ASP identifier (ASP ID), an application identifier (APP ID), an access point name (APN), and an application function identifier (AF ID). In other words, the reference information of the application may include one or more of the API invoker network element identifier, the ASP identifier, the APP ID, the APN, and the AF ID.

For example, Tencent is an application service provider (ASP). When Tencent signs a business agreement with a PLMN operator, the PLMN operator allocates, to Tencent, an identifier (for example, asp.tencent) used to identify Tencent. The identifier may be identified by a network element in a PLMN domain, and an application identifier may be a QQ application identifier, a WeChat application identifier, or the like. Alternatively, for example, the APN is a name of an access point accessed by the WeChat application. Usually, the APN accessed by the WeChat application is unique. Therefore, the WeChat application may be determined based on the APN.

The first network element may be an AEF network element, an APF network element, or a PCF network element.

Step 202: The first network element sends, based on the reference information of the application, the network slice information corresponding to the application to the CCF network element.

In an implementation, the first network element stores a correspondence between the reference information of the application and the network slice information. The correspondence may be configured by a network management system of an operator, or when an operator subscribes to a third-party application, the operator stores subscription information that includes the correspondence in the first network element. Therefore, the first network element may locally find, based on the reference information of the application, the network slice information corresponding to the application. The network slice information, for example, a network slice identifier (Slice ID) such as S-NSSAI, may be used to identify a network slice.

For example, if the first network element stores a correspondence between the APP ID and the network slice identifier, and the first request message carries the APP ID, the first network element may determine, based on the correspondence, a network slice identifier corresponding to the APP ID carried in the first request message.

The network slice information corresponding to the application may be used to identify a network slice that provides a service for the application, and the network slice identifier may be a slice identifier (Slice ID) such as the single network slice selection assistance information (S-NSSAI).

If the CCF network element sends, to the first network element, the first request message that includes the reference information of the application, the first network element may send, by using a message, the network slice information corresponding to the application to the CCF network element. For example, a first response message sent by the first network element to the CCF network element includes the network slice information corresponding to the application. If the CCF network element sends the reference information of the application to the first network element by invoking the API, the first network element may also feed back, to the first network element through the API, the parameter information, namely, the network slice information corresponding to the application. Alternatively, the network slice information corresponding to the application is returned in another callback communications interface.

Step 203: The CCF network element receives, from the first network element, the network slice information corresponding to the application.

According to the foregoing steps, the CCF network element may obtain, from the first network element based on the reference information of the application, the network slice information corresponding to the application, and subsequently, the CCF network element can accurately search a network slice corresponding to the network slice information for the API.

Optionally, in an implementation of the embodiment shown in FIG. 2, before step 201, the method further includes: The APF network element sends an API publish request message to the CCF network element.

The API publish request message may include a correspondence between the network slice information and API information. Specifically, the correspondence between the network slice information and the API information may be established by using a pointer, a link, a table, or the like. Usually, one network slice may correspond to a plurality of APIs, and one API uniquely corresponds to one network slice.

Further, the method may include: After receiving the API publish request message, the CCF network element locally stores the correspondence between the network slice information and the API information. In this way, when the API invoker network element requests to search for the API, the CCF network element can accurately find locally, based on the network slice information, the API information that the API invoker network element requests to search for.

The API information is used to describe the API, and may include API identifier information, an API type, an API communication type, an API description, interface information (such as an IP address, a port number, and a URI), a protocol type, an API version, an API data format, and the like.

The API type may be a charging related type, a quality of service (QOS) management related type, a location related type, or the like.

The protocol type may be the hypertext transfer protocol (HTTP), a representational state transfer (REST), a remote procedure call (RPC), or the like.

The interface information may be a conditional parameter such as the IP address, the port number, or the uniform resource identifier (URI).

In addition, the API identifier information is used to identify one API, and may be a name of the API, a number (for example, 001) of the API, a relative address of the API, or an absolute address of the API. This is not limited.

The name of the API may be, for example, a Google Calendar API, or calendar.googleapis.com.

Optionally, before step 201, the API invoker network element may first send an API discover request message to the CCF network element. The API discover request message includes an API inquiry parameter and the reference information that is of the application. In other words, the reference information that is of the application and that is in the first request message sent by the CCF network element may be the API discover request message sent by the API invoker network element.

The API inquiry parameter may include at least one of the API type, a transfer protocol type, and the interface information. For specific content of the API type, the transfer protocol type, and the interface information, refer to the foregoing descriptions. Details are not described herein again.

The API discover request message may be used to search for the API.

Correspondingly, after the CCF network element receives the first response message from the first network element, the method further includes: The CCF network element determines target API information based on the correspondence between the network slice information and the API information, the network slice information in the first response message, and the API inquiry parameter.

Specifically, after receiving the first response message, the CCF network element obtains, from the first response message, the network slice information corresponding to the application, then finds, by using a locally stored correspondence between the network slice information and the target API, the API information corresponding to the network slice information, and then selects, based on the API inquiry parameter, the target API information that meets the API inquiry parameter from the API information corresponding to the network slice information. For example, when the API inquiry parameter specifies that the API type is charging and the transfer protocol is HTTP, the CCF selects, from the API information corresponding to the network slice information, the API information whose API type is charging and whose transmission protocol is HTTP as the target API information.

For example, after receiving the first response message, the CCF network element may obtain the network slice identifier from the first response message, and then determine, based on a correspondence between the network slice identifier and the name of the API, that the network slice identifier corresponds to the Google Calendar API and calendar.googleapis.com. The CCF network element then determines, based on the API inquiry parameter, that the Google Calendar API is the target API information.

Optionally, after step 203, the CCF network element may further send the network slice information and the target API information to the API invoker network element. In this way, subsequently, the API invoker network element may request, from the AEF network element based on the network slice information and the target API information, target network element information corresponding to the network slice information and the target API information.

A target network element is a network element that provides a target API and that is in the network slice corresponding to the application, for example, a session management function (SMF) network element or an access and mobility management (Access and Mobility Management Function, AMF) network element.

The target network element information is used to identify the target network element, for example, an internet protocol address (IP) or a uniform resource locator (URL) address of the target network element.

The target network element may provide the API for the API invoker network element, to invoke the API from the target network element after the API invoker network element obtains the network slice information. Alternatively, when the API invoker network element requests to invoke the target API corresponding to the target API information, the target network element may execute the target API. The executing the target API refers to running logical processing of the target API.

Optionally, in another implementation of the embodiment shown in FIG. 2, step 201 may be replaced with the following: When the CCF network element does not store network slice information corresponding to reference information of an application, the CCF network element may send the reference information of the application to a first network element.

It should be noted that, if the CCF network element already buffers the correspondence between the reference information of the application and the network slice information, the CCF network element may not send the reference information of the application to the first network element, but directly finds, based on the reference information of the application of the API invoker network element, the network slice information from the information buffered by the CCF network element API invoker. Further, the CCF network element finds the target API information based on the network slice information, the API inquiry parameter, and the correspondence between the network slice information and the API information, and sends the target API information to the API invoker network element. It can be learned that the CCF network element directly searches locally for the network slice information corresponding to the reference information of the application, so that the network slice information can be found in a timely manner, thereby reducing a communication interaction latency and signaling load.

In a possible implementation, the CCF network element may further actively subscribe to, from the first network element, the network slice information corresponding to the reference information of the application. In this way, when the network slice information corresponding to the reference information of the application in the first network element changes, the first network element sends a notification message to the CCF network element. The notification message carries latest network slice information corresponding to the reference information of the application. Alternatively, in another possible implementation, the CCF network element may periodically send a request to the first network element or the CCF network element may send a request to the first network element based on an event, to request latest network slice information corresponding to the reference information of the application.

The following describes a specific implementation process of the foregoing communication method with reference to FIG. 3A, FIG. 3B, FIG. 3C, and FIG. 3D. Network elements in FIG. 3A, FIG. 3B, FIG. 3C, and FIG. 3D interact with each other by using a message.

Step 301a: The APF network element sends an API publish request message to the CCF network element.

The API publish request message may include a correspondence between API information and network slice information.

Usually, a network element in a network slice may provide a plurality of different APIs, and such APIs can implement different network function NF service), for example, PDU session services. The different network slices may provide an API of a same network function service.

The network function service is a function exposed by a network function entity through an API, and may be used by another network function entity. The network function entity may be the network element mentioned in this application, for example, the API invoker network element, the CCF network element, or the PCF network element.

Step 301b: After receiving the API publish request message, the CCF network element locally stores the correspondence between the API information and the network slice information.

Step 302: The API invoker network element sends an API discover request message to the CCF network element.

The API discover request message includes reference information of an application and an API inquiry parameter. For the reference information of the application and the API inquiry parameter, refer to the foregoing related descriptions. Details are not described again.

Step 303a: The CCF network element sends a first request message to the first network element.

The first request message includes the reference information of the application.

The first network element may be the AEF network element, the APF network element, or the PCF network element.

Step 303b: The first network element determines, based on the reference information of the application, network slice information corresponding to the application. The network slice information may be a network slice identifier such as S-NSSAI.

In an example, the first network element may store a correspondence between the reference information of the application and the network slice information, and the first network element may find, based on the correspondence, the network slice information corresponding to the application.

In another example, a UDR stores a correspondence between the reference information of the application and the network slice information. The first network element may send the reference information of the application to the UDR, and the UDR determines, based on the correspondence, the network slice information corresponding to the application, and sends the determined network slice information to the first network element.

Step 303c: The first network element sends a first response message to the CCF network element.

The first response message includes the network slice information corresponding to the application.

For example, if the network slice information that corresponds to the application and that is determined in step 303b includes information about a plurality of network slices, the first network element may send the information about the plurality of network slices to the CCF network element in a list form.

Step 304: The CCF network element determines target API information based on the API inquiry parameter, the network slice information in the first response message, and the correspondence between the API information and the network slice information.

For example, the CCF network element may first determine, based on the correspondence between the network slice information and the API information, an API provided by a network slice corresponding to the network slice information, and then determine, based on the API inquiry parameter, the target API information that meets an API inquiry condition.

Step 305: The CCF network element sends a discover request response message to the API invoker network element.

The discover request response message includes the target API information.

Further, the discover request response message may include the network slice information, or a correspondence between the target API information and the network slice information. In this way, after receiving the discover request response message, the API invoker network element may invoke a target API of the network slice corresponding to the network slice information.

Through step 301 to step 305, the CCF network element can obtain, from the first network element, the network slice information corresponding to the application, and then can accurately find, from the network slice corresponding to the network slice information, the API information that meets the API inquiry parameter.

In a possible implementation, step 303a may be replaced with the following: If the CCF network element does not store a correspondence between the network slice information and the reference information of the application, the CCF network element may send a first request message to the first network element.

In another possible implementation, if the CCF network element stores the correspondence between the network slice information and the reference information of the application, steps 303a to 303c may be replaced with the following: The CCF network element determines, based on the correspondence, network slice information corresponding to the application.

According to the method provided in the foregoing embodiment, the CCF network element can obtain the network slice information from the first network element based on the reference information of the application, and subsequently, the CCF network element can accurately search the network slice corresponding to the network slice information for an API.

Optionally, in a possible implementation of the embodiment shown in FIG. 3A, FIG. 3B, FIG. 3C, and FIG. 3D, after steps 301 to 305, the method further includes steps 306 to 309.

After steps 301 to 305 are performed, the API invoker network element obtains, from the CCF network element, the target API information and the network slice information that provides the target API. Subsequently, the API invoker network element may initiate an API invoker process to the AEF network element. The process is shown in FIG. 3A, FIG. 3B, FIG. 3C, and FIG. 3D, and is specifically as follows.

Step 306: The API invoker network element sends an API invoker request message to the AEF network element.

The API invoker request message may include the target API information, the network slice information, or the correspondence between the target API information and the network slice information. The target API information, the network slice information, or the correspondence between the target API information and the network slice information is obtained by the API invoker network element from the discover request response message.

Step 307a: The AEF network element sends a network function discovery request message to an NRF network element.

The network function discovery request message includes the target API information and the network slice information corresponding to the application.

It should be noted that, when the first network element is the AEF network element, the AEF network element in step 306 to step 308 may be the first network element.

Step 307b: The NRF network element determines target network element information based on the target API information and the network slice information corresponding to the application.

For specific content of a target network element and the target network element information, refer to the foregoing descriptions.

Because the target network element registers the API information and the network slice information corresponding to the target network element with the NRF network element in advance, the NRF network element stores a correspondence between the target network element information and the network slice information and the API information. Therefore, the NRF network element can determine the target network element information based on the network slice information and the target API information.

Step 307c: The NRF network element sends a network function discovery response message to the API invoker network element.

The network function discovery response message includes the target network element information.

Step 308a: The AEF network element sends a second invoking request message to the target network element based on the target network element information.

The second invoking request message includes the target API information.

Step 308b: The target network element executes the target API corresponding to the target API information, and generates an invoking result.

Step 308c: The target network element sends the generated invoking result to the AEF network element.

Step 309: The AEF network element sends the API invoker result to the API invoker network element.

For example, the invoking result is information indicating a success or information indicating a failure. If the invoking result is information indicating a failure, the invoking result may further include a cause value of the failure.

In this way, through step 306 to step 309, when the API invoker network element initiates API invoker, the AEF network element can find, from the network slice, the target network element corresponding to the target API information, and the AEF network element obtains the API invoker result through the target network element, so that the API invoker result is fed back to the API invoker network element, thereby achieving an objective of invoking the API.

Optionally, in another implementation of the embodiment shown in FIG. 2, after step 202, if the first network element is the AEF network element or the APF network element, when the AEF network element or the APF network element does not store the correspondence between the network slice information and the reference information of the application, the network slice information corresponding to the application may be determined through the PCF network element. The following describes a specific implementation process of the foregoing communication method with reference to FIG. 4A and FIG. 4B. Network elements in FIG. 4A and FIG. 4B interact with each other by using a message.

Step 401: An APF network element sends an API publish request message to a CCF network element.

The API publish request message may include a correspondence between API information and network slice information. For the correspondence between the network slice information and the API information, refer to the foregoing descriptions. Details are not described herein again.

Step 402: An API invoker network element sends an API discover request message to the CCF network element.

The API discover request message includes reference information of an application and an API inquiry parameter. For the reference information of the application and the API inquiry parameter, refer to the foregoing related descriptions. Details are not described again.

Step 403a: The CCF network element sends a first request message to an AEF network element or an APF network element.

The first request message includes the reference information of the application.

Step 403b: The AEF network element or the APF network element determines, based on the reference information of the application, the network slice information corresponding to the application.

The network slice information may be a network slice identifier such as S-NSSAI.

Step 404a: The AEF network element or the APF network element does not locally store the correspondence between the network slice information and the API information. Therefore, the AEF network element or the APF network element sends a network slice search request message to a PCF network element, and the message includes the reference information of the application.

Step 404b: The PCF network element determines, based on the reference information of the application, the network slice information corresponding to the application. For example, the network slice information may be the network slice identifier such as the S-NSSAI.

Because the PCF network element already stores the correspondence between the reference information of the application and the network slice information, and the correspondence may be configured by a network management system of an operator, or may be stored in the PCF network element by an operator when the operator subscribes to a third-party application, the PCF network element may locally find, based on the reference information of the application, the network slice information corresponding to the application.

Step 404c: The PCF network element sends a network slice search response message to the AEF network element or the APF network element, where the message includes the network slice information corresponding to the application.

S403c: The AEF network element or the APF network element sends a first response message to the CCF network element.

The first response message includes the network slice information corresponding to the application.

For example, if the network slice information that corresponds to the application and that is determined in step 403c includes information about a plurality of network slices, the AEF network element or the APF network element may send the information about the plurality of network slices to the CCF network element in a list form.

Step 405: The CCF network element determines target API information based on the API inquiry parameter, the network slice information in the first response message, and the correspondence between the API information and the network slice information.

For example, the CCF network element may first determine, based on the correspondence between the network slice information and the API information, an API provided by a network slice corresponding to the network slice information, and then determine, based on the API inquiry parameter, the target API information that meets an API inquiry condition.

Step 406: The CCF network element returns a search request response message to the API invoker network element.

The discover request response message includes the target API information.

Further, the discover request response message may include the network slice information, or the correspondence between the target API information and the network slice information. In this way, after receiving the discover request response message, the API invoker network element may invoke the target API of the network slice corresponding to the network slice information.

It should be noted that, in another implementation of the embodiment shown in FIG. 2, after step 202, if the first network element is the PCF network element, when the PCF does not store the correspondence between the network slice information and the reference information of the application, the network slice information corresponding to the application may be further determined through the AEF network element or the APF network element. In other words, in step 403a and step 403b, the AEF network element or the APF network element may be replaced with the PCF network element. Step 404a is replaced with the following: A PCF network element sends a network slice search request message to the AEF network element or the APF network element. Step 404*b* is replaced with the following: The AEF network element or the APF network element determines, based on the reference information of the application, the network slice information corresponding to the application. Step 404*c* is replaced with the following: The AEF network element or the APF network element sends a network slice search response message to the PCF network element. Step 403*c* is replaced with the following: The PCF network element sends a first response message to the CCF network element.

Figure 4A:
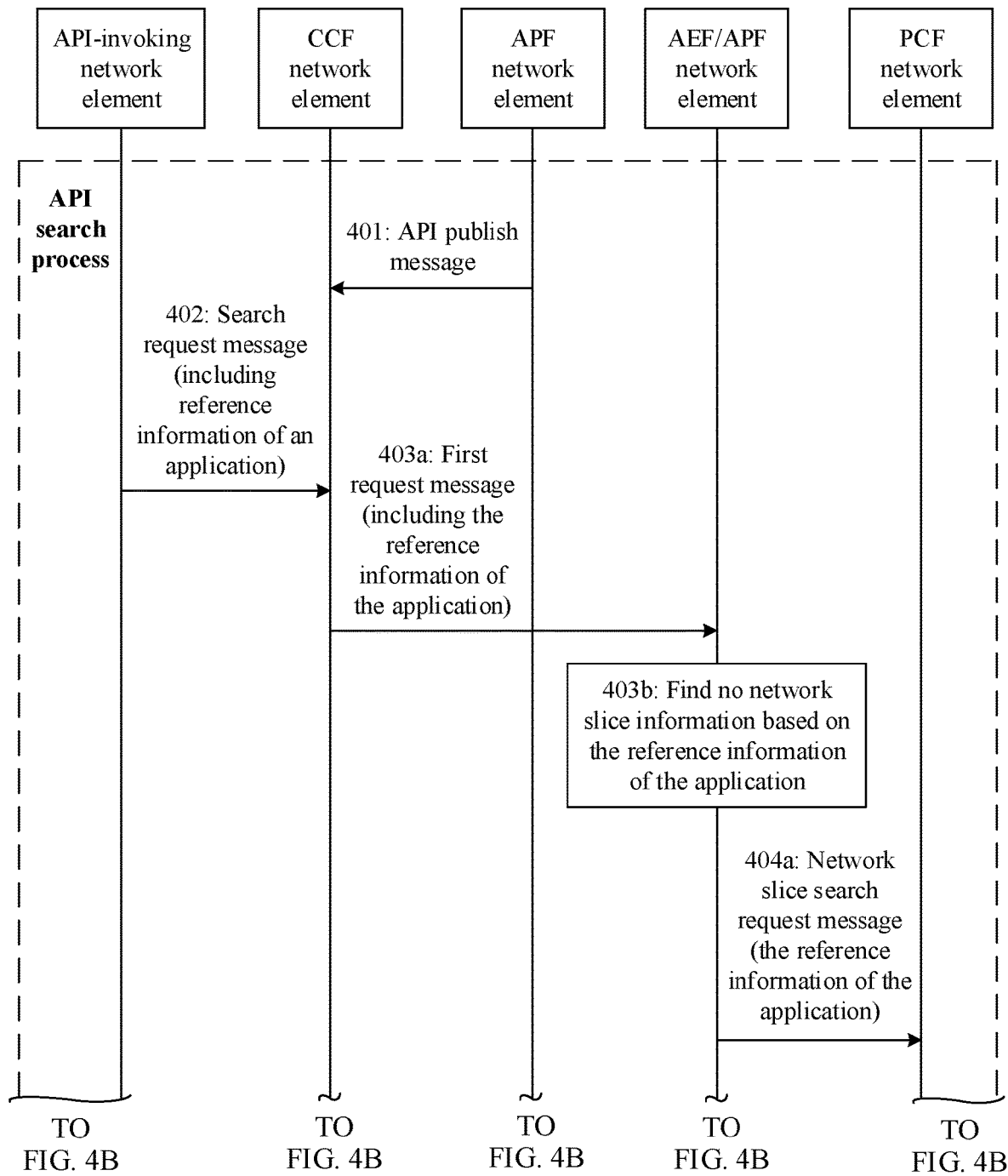
FIG. 4A and FIG. 4B are a schematic diagram of another API discovery procedure according to an embodiment of this application.
Figure 4B:
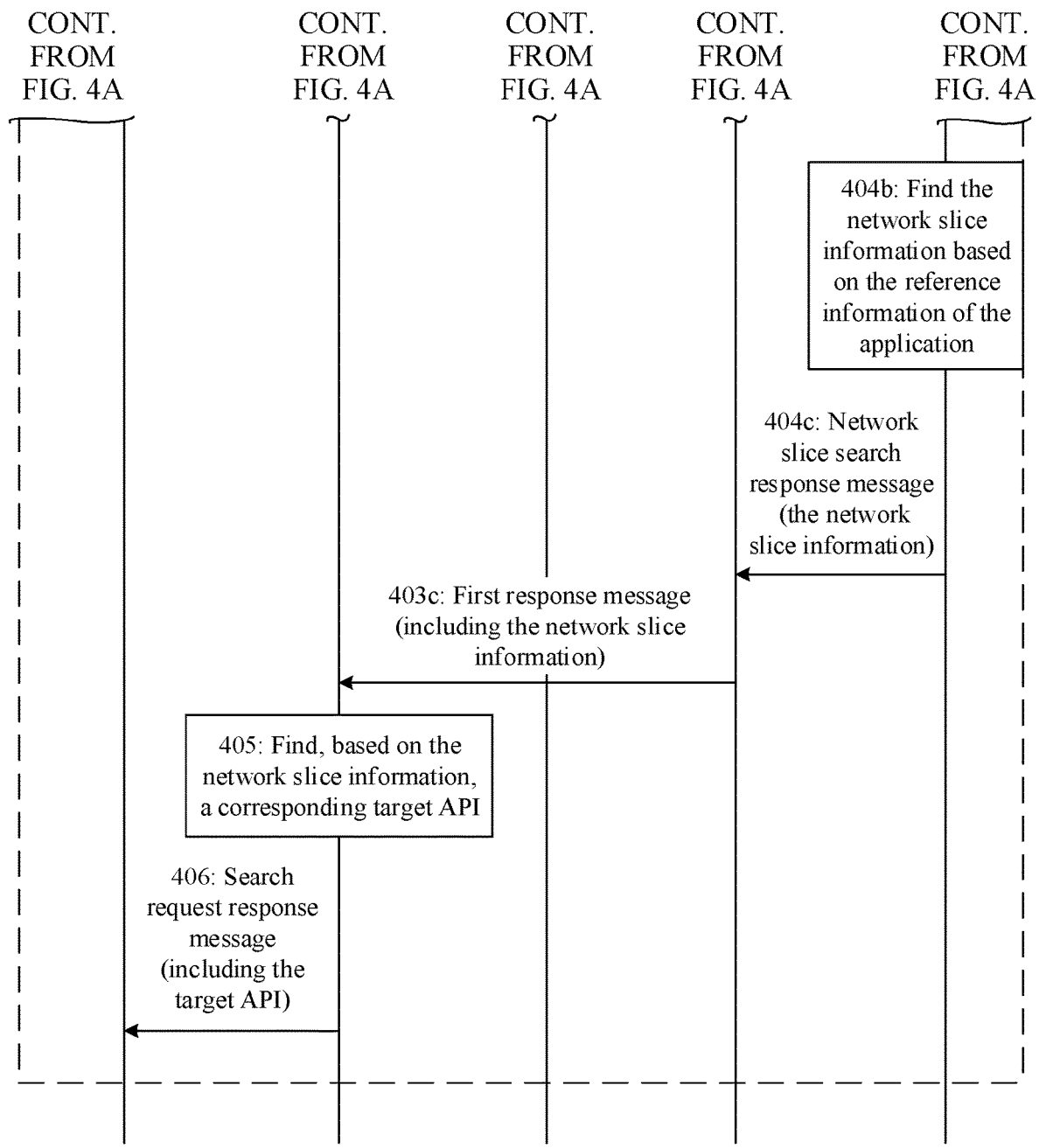

Optionally, in a possible implementation of the embodiment shown in FIG. 4A and FIG. 4B, after steps 401 to 406, the method further includes steps 407 to 410.

After steps 401 to 406 are performed, the API invoker network element obtains, from the CCF network element, the target API information and the network slice information that provides the target API. Subsequently, the API invoker network element may initiate the API invoker process to the AEF network element. The process is shown in FIG. 4A and FIG. 4B. Content of step 407 to step 410 is the same as that of step 306 to step 309 in FIG. 3A, FIG. 3B, FIG. 3C, and FIG. 3D. Details are not described herein again.

In this way, through step 407 to step 410, when the API invoker network element initiates the API invoker, the AEF network element can find, from the network slice, the target network element corresponding to the target API information, and the AEF network element obtains the API invoker result through the target network element, so that the API invoker result is fed back to the API invoker network element, thereby achieving an objective of invoking the API.

Figure 5:
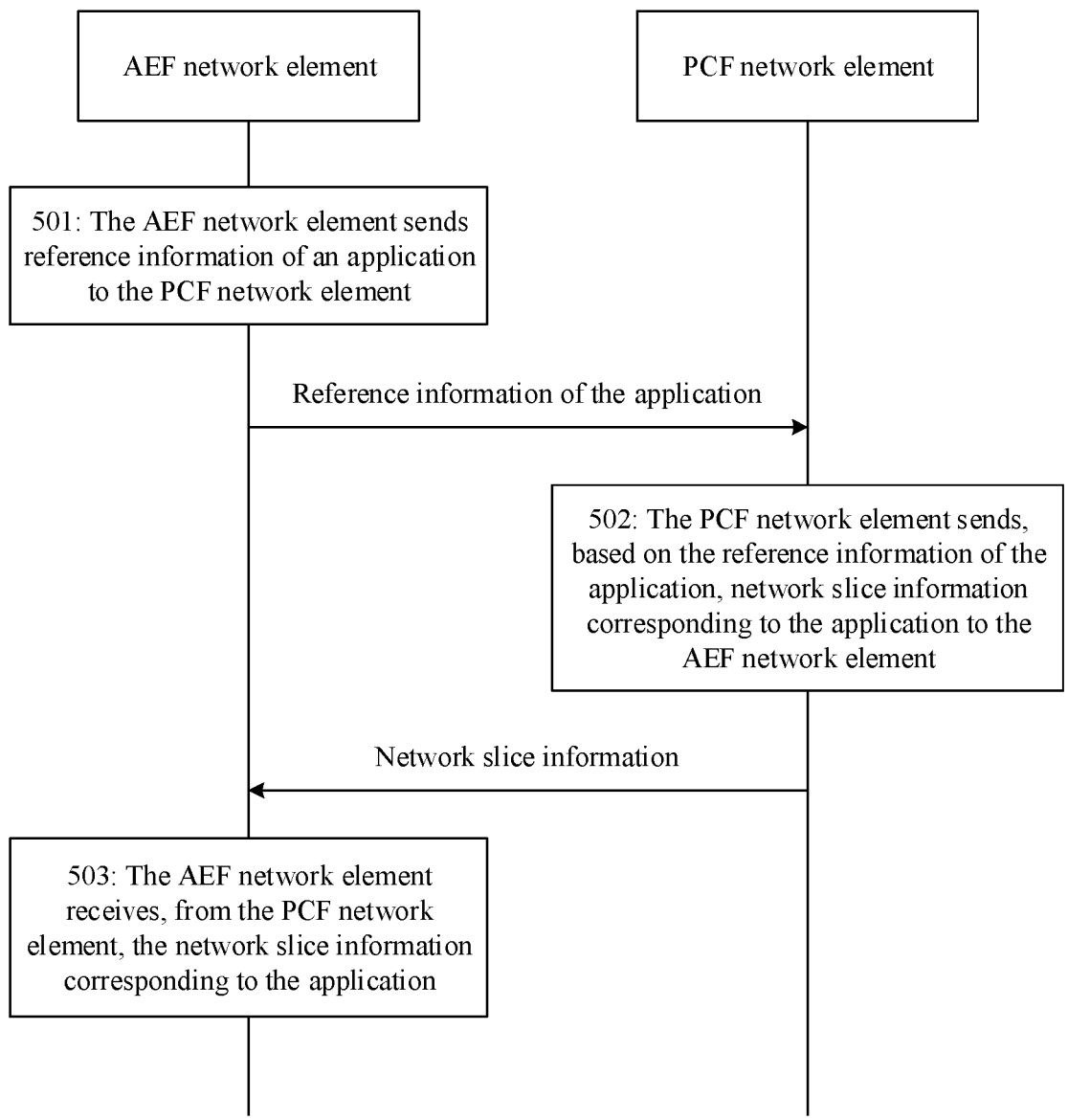
FIG. 5 is a schematic diagram of another communication method according to an embodiment of this application.

FIG. 5 is a schematic diagram of another communication method according to this application, and the method includes the following steps:

Step 501: An AEF network element sends reference information of an application to a PCF network element.

The AEF network element may send the reference information of the application to the PCF network element by sending a message. For example, a second request message sent by the AEF to the PCF network element includes the reference information of the application. The second request message may be a slice information discovery request (Slice info discover request) message or a slice information inquiry request (Slice info inquiry request) message. The AEF network element may also send the reference information of the application to the PCF network element by invoking an API. For example, there is an API between the AEF network element and the PCF network element, and the AEF network element transfers the parameter information of the reference information of the application to the PCF network element by invoking the API.

The reference information of the application may be at least one of an API invoker network element identifier, an ASP ID, an APP ID, and an APN. For details, refer to the description in step 201. Details are not described herein again.

The second request message may be a slice information discovery request (Slice info discover request) message or a slice information inquiry request (Slice info inquiry request) message.

Step 502: The PCF network element sends, based on the reference information of the application, network slice information corresponding to the application to the AEF network element.

In an implementation, the PCF network element stores a correspondence between the reference information of the application and the network slice information. The correspondence may be configured by a network management system of an operator, or when an operator subscribes to a third-party application, the operator stores subscription information that includes the correspondence in the PCF network element. The PCF network element may locally find, based on the reference information of the application, the network slice information corresponding to the application. The network slice information, for example, a network slice identifier (Slice ID) such as S-NSSAI, may be used to identify a network slice.

For example, if the PCF network element stores a correspondence between the APP ID and the network slice identifier, and the second request message carries the APP ID, the PCF network element may determine, based on the correspondence, a network slice identifier corresponding to the APP ID carried in the second request message.

Step 503: The AEF network element receives, from the PCF network element, the network slice information corresponding to the application.

If the AEF network element sends, to the PCF network element, the second request message that includes the reference information of the application, the PCF network element may send, by using a message, the network slice information corresponding to the application to the AEF network element. For example, a second response message includes the network slice information corresponding to the application. If the AEF network element sends the reference information of the application to the PCF network element by invoking the API, the PCF network element may also feed back, to the first network element through the API, the parameter information, namely, the network slice information corresponding to the application.

According to the foregoing steps, the AEF network element may obtain the network slice information from the PCF network element based on the reference information of the application.

Optionally, in an implementation of the embodiment shown in FIG. 5, before step 501, the method further includes: The AEF network element receives a first invoking request message from an API invoker network element. The first invoking request message includes the reference information of the application and target API information requested to be invoked. After receiving the first invoking request message, the AEF network element is triggered to obtain the network slice information from the PCF network element.

Further, the method includes: After step 503 is performed, to be specific, after the AEF network element obtains the network slice information, the AEF network element may send a network function discovery request message to an NRF network element. Because the network function discovery request message includes the network slice information, the NRF network element may find, based on the network slice information and the target API information, target network element information provided by the network slice, and then the AEF network element receives a network function discovery response message from the NRF network element. The network function discovery response message includes the target network element information corresponding to the network slice information. It can be learned that the AEF network element may find the target network element information from the NRF network element based on the network slice information and the target API information.

Further, the method may include: After obtaining a target network element, the AEF network element sends a second invoking request message to the target network element corresponding to the target network element information. The second invoking request message includes API information, and then the target network element invokes the API, and generates an invoking result. Then, the AEF network element receives the invoking result of the API from the target network element, and then feeds back the invoking result to the API invoker network element, so as to achieve an objective of invoking the API.

Optionally: in another implementation of the embodiment shown in FIG. 5, step 501 may be replaced with the following: When an AEF network element does not store network slice information corresponding to reference information of an application, the AEF network element may send the reference information of the application to a PCF network element.

It should be noted that, if the AEF network element already buffers the correspondence between the reference information of the application and the network slice information, the AEF network element may not send the reference information of the application to the PCF network element, but directly finds, based on the reference information of the application of the API invoker network element, the network slice information from the information buffered by the AEF network element API invoker. Further, the AEF network element finds the target API information based on the network slice information, an API inquiry parameter, and the correspondence between the network slice information and the API information, and sends the target API information to the API invoker network element. It can be learned that the AEF network element directly searches locally for the network slice information corresponding to the reference information of the application, so that the network slice information can be found in a timely manner, thereby reducing a communication interaction latency and signaling load.

Figure 6A:
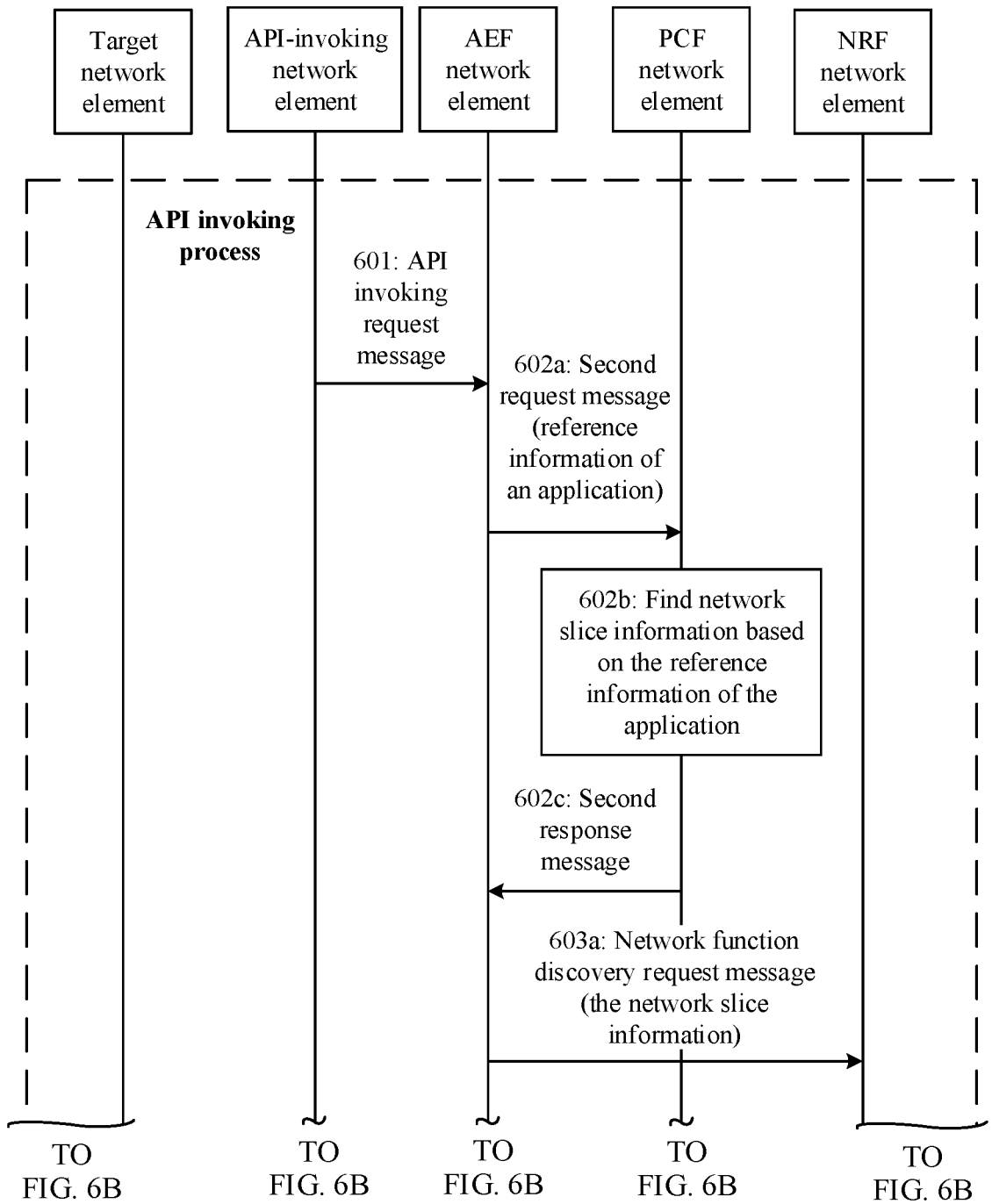
FIG. 6A and FIG. 6B are a schematic diagram of an API invoker procedure according to an embodiment of this application.
Figure 6B:
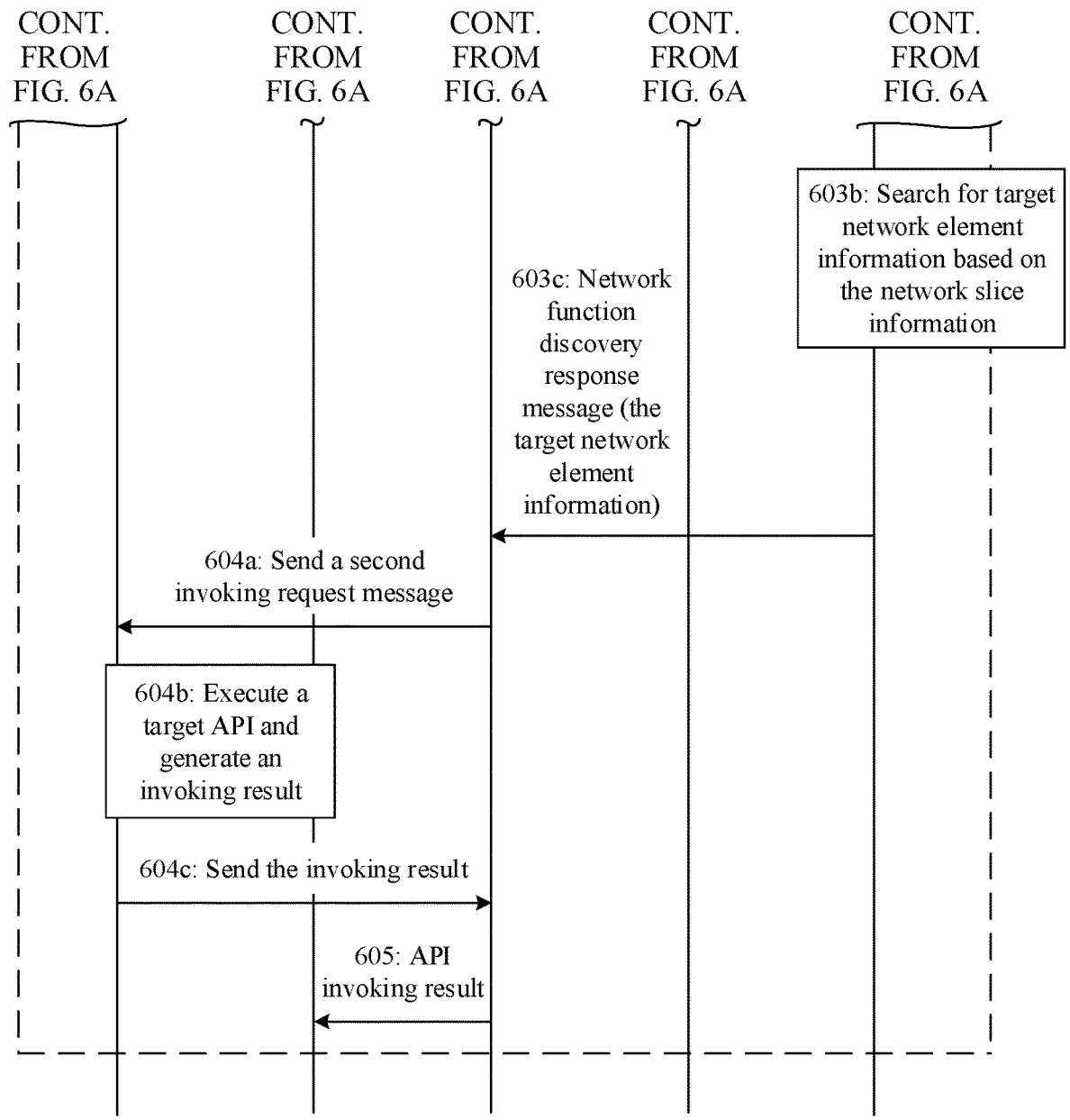

The following describes an implementation process of the foregoing communication method with reference to FIG. 6A and FIG. 6B. Network elements in FIG. 6A and FIG. 6B interact with each other by using a message.

Step 601: An API invoker network element sends an API invoker request message to an AEF network element.

The API invoker request message includes reference information of an application and target API information.

For specific content of the reference information of the application, refer to the description in step 201. Details are not described herein again. In this embodiment, an example in which the reference information of the application is a WeChat application identifier and the target API information is an API name is used for description.

Step 602a: The AEF network element sends a second request message to a PCF network element.

The second request message includes the reference information of the application.

For example, the AEF network element sends a second request message that includes the WeChat application identifier to the PCF network element.

Step 602b: The PCF network element determines, based on the reference information of the application, network slice information corresponding to the application.

For example, the PCF network element determines, based on the WeChat application identifier, S-NSSAI corresponding to the WeChat application identifier.

Step 602c: The PCF network element sends a second response message to the AEF network element.

The first response message includes the network slice information corresponding to the application.

For example, the PCF network element sends, to the AEF network element, the second response message that includes the S-NSSAI corresponding to the WeChat application identifier.

Step 603a: The AEF network element sends a network function discovery request message to an NRF network element.

The network function discovery request message includes the target API information and the network slice information corresponding to the application.

For example, the AEF network element sends the S-NSSAI corresponding to the WeChat application identifier and a name of the target API to the NRF network element.

Step 603b: The NRF network element finds target network element information based on the network slice information and the target API information.

For specific content of a target network element and the target network element information, refer to the foregoing descriptions.

Because the target network element registers API information and the network slice information corresponding to the target network element with the NRF network element in advance, the NRF network element stores a correspondence between the target network element information and the network slice information and the API information. Therefore, the NRF network element can determine the target network element information based on the network slice information and the target API information.

For example, the NRF network element finds an SMF 1 based on the S-NSSAI corresponding to the WeChat application identifier and the name of the target API.

Step 603c: The NRF network element sends a network function discovery response message to the AEF network element.

The network function discovery response message includes the target network element information.

For example, the NRF network element sends an identifier of the SMF 1 to the AEF network element.

Step 604a: The AEF network element sends a second invoking request message to the target network element based on the target network element information, where the second invoking request message includes the target API information.

Step 604b: The target network element executes the target API corresponding to the target API information, and generates an invoking result.

Step 604c: The target network element sends the generated invoking result to the AEF network element.

Step 605: The AEF network element sends the API invoker result to the API invoker network element.

For example, the invoking result is information indicating a success or information indicating a failure. If the invoking result is information indicating a failure, the invoking result may further include a cause value of the failure.

According to the foregoing communication method, the AEF network element may obtain the network slice information from the PCF network element based on the reference information of the application, and then may find the target network element information based on the network slice information. The target network element may complete API invoker and generate the invoking result, so that the AEF network element feeds back the invoking result to the API invoker network element, thereby achieving an objective of invoking the API.

Figure 7:
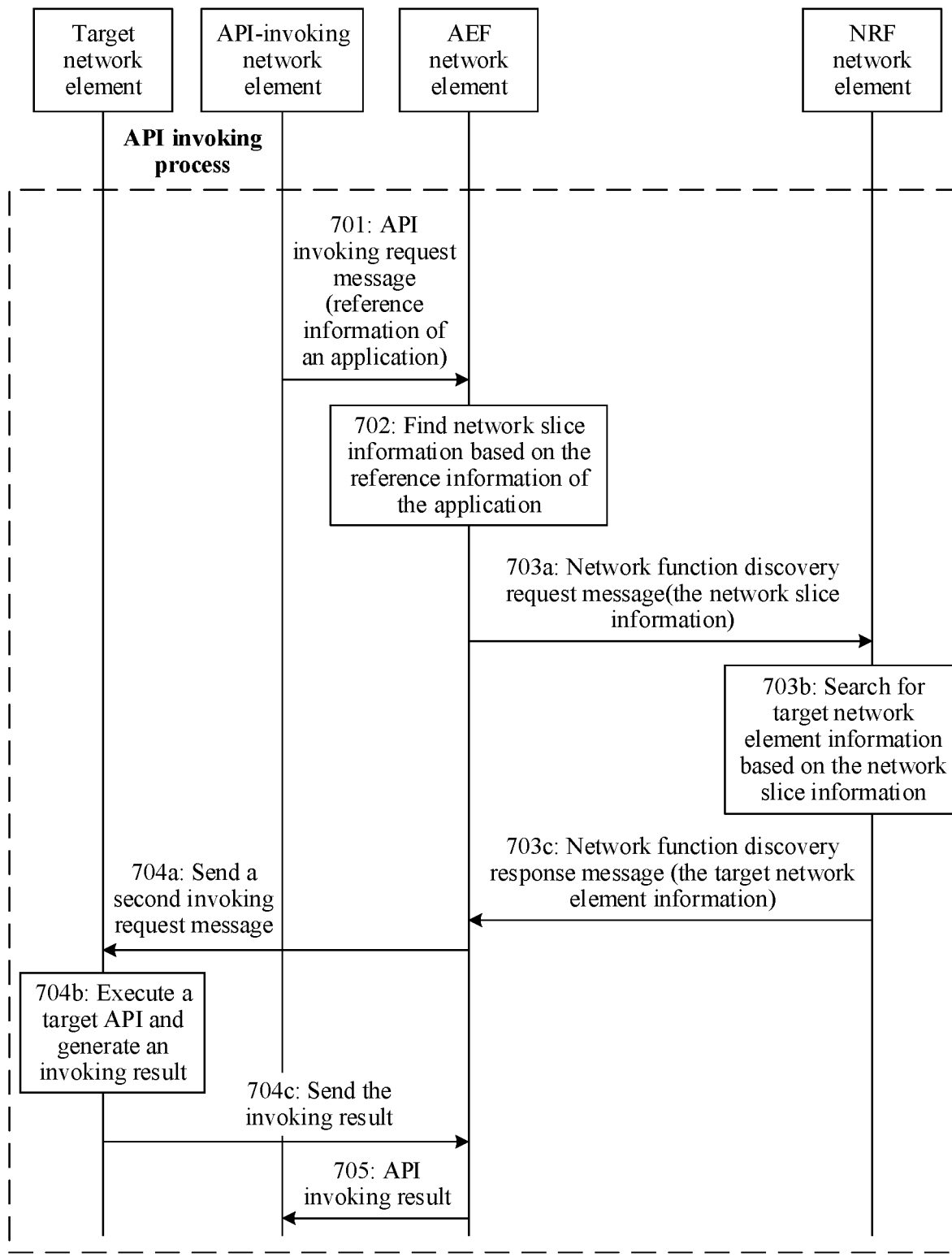
FIG. 7 is a schematic diagram of another API invoker procedure according to an embodiment of this application.

Optionally, in another implementation of the embodiment shown in FIG. 5, step 501 and step 502 may be replaced with the following: When an AEF network element stores a correspondence between network slice information and reference information of an application, the AEF network element directly searches the AEF network element for network slice information corresponding to the application. The following describes an implementation process of the implementation with reference to FIG. 7.

Step 701: An API invoker network element sends an API invoker request message to an AEF network element.

The API invoker request message includes reference information of an application.

The reference information of the application may be at least one of an API invoker network element identifier, an ASP ID, an APP ID, and an APN. For details, refer to the description in step 201. Details are not described herein again.

Step 702: The AEF network element determines, based on the reference information of the application, network slice information corresponding to the application.

The AEF network element already stores a correspondence between the reference information of the application and the network slice information. The correspondence may be configured by a network management system of an operator, or when an operator subscribes to a third-party application, the operator stores subscription information that includes the correspondence in the AEF network element. The AEF network element may locally determine, based on the reference information of the application, the network slice information corresponding to the application. For example, the AEF network element finds, based on a WeChat application identifier, S-NSSAI corresponding to the WeChat application identifier.

Step 703a: The AEF network element sends a network function discovery request message to an NRF network element.

The network function discovery request message includes the network slice information and target API information.

Step 703b: The NRF network element finds target network element information based on the network slice information and the target API information.

Step 703c: The NRF network element sends a network function discovery response message to the AEF network element.

The network function discovery response message includes the target network element information.

Step 704a: The AEF network element determines a target network element based on the target network element, and then sends a second invoking request message to the target network element, where the second invoking request message includes the target API information.

Step 704b: The target network element executes the target API corresponding to the target API information, and generates an invoking result.

Step 704c: The target network element sends the generated invoking result to the AEF network element.

Step 705: The AEF network element sends the API invoker result to the API invoker network element.

For example, the invoking result is information indicating a success or information indicating a failure. If the invoking result is information indicating a failure, the invoking result may further include a cause value of the failure.

According to the foregoing communication method, the AEF network element may directly obtain locally the network slice information based on the reference information of the application, and then may find the target network element information based on the network slice information. The target network element may complete API invoker and generate the invoking result, so that the AEF network element feeds back the invoking result to the API invoker network element, thereby achieving an objective of invoking the API, and reducing a communication interaction latency and signaling load.

Figure 8A:
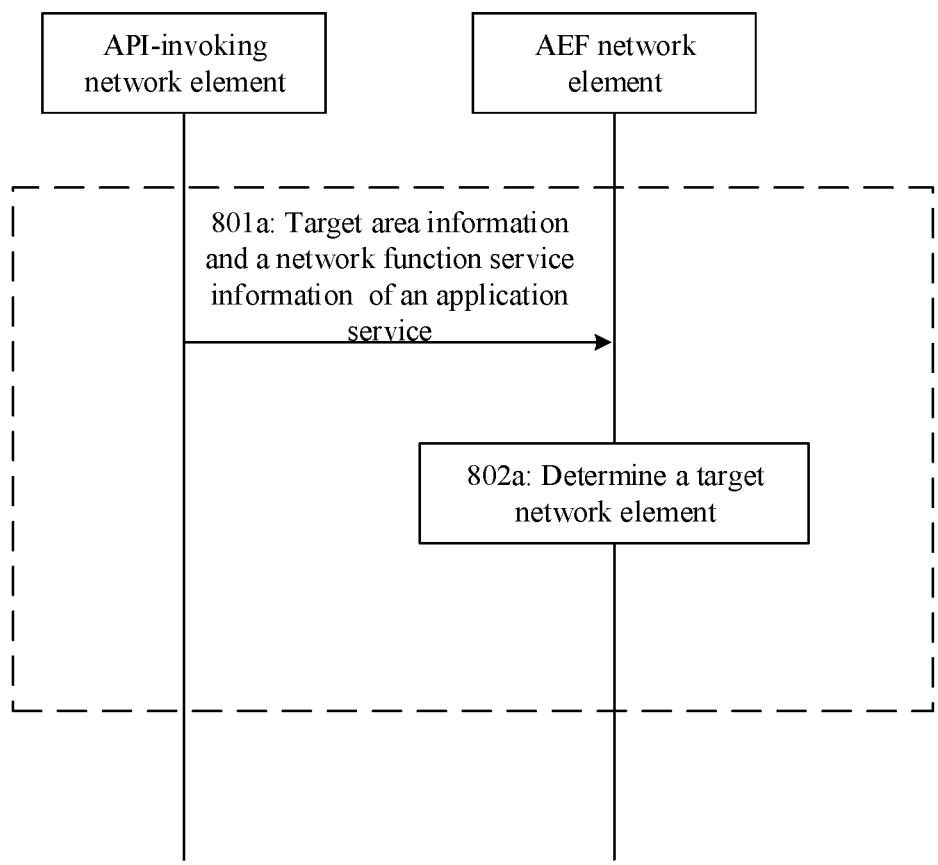
FIG. 8a and FIG. 8b are schematic diagrams of another communication method according to an embodiment of this application.

FIG. 8a is a schematic diagram of another communication method according to this application, and the method includes the following steps:

Step 801a: An API invoker network element sends information about a target area of an application service and network function service information corresponding to the application service to an AEF network element.

The API invoker network element may send, to the AEF network element by sending a message, the information about the target area of the application service and the network function service information corresponding to the application service. For example, a third request message sent by the API invoker network element to the AEF network element includes the information about the target area of the application service and the network function service information corresponding to the application service.

In addition, the API invoker network element may also send the foregoing information to the AEF network element by invoking an API. For example, there is an API between the API invoker network element and the AEF network element, and the API is a network function service corresponding to the application service. The API invoker network element transfers the parameter information of the target area of the application service to the AEF network element by invoking the API.

The third request message may be an API invoker request message, or may be a network service function invoking request.

The network function service (NF service) may be an API, and the network function service information may be API information.

The target area of the application service (application service area) is used to indicate that the API invoker network element is an area of a service application requested by the application service.

Assuming that the application is a V2X application, the application service may be a V2X application service, and the target area of the application service may mean that the target area of the V2X application service is Beijing. Assuming that the application is a Baidu self-driving application, the application service may be the Baidu self-driving application service, and the target area of the application service may be a ribbon area of the entire Beijing information road.

The API invoker network element may be a V2X application function entity. Step 801 may be as follows: The API invoker network element may send the third request message to the AEF network element, where the third request message is a broadcast transmission request message. The message carries a broadcast service target area and broadcast session function (Nsmf_MBS_session) information that the V2X application function entity requests to broadcast the V2X message. The broadcast session function service information may be a message type or a message name of the broadcast transmission request message, and is used to indicate a function of the broadcast transmission request message.

If network elements communicate with each other by invoking the API, for example, step 801 may be understood as the following: The API invoker network element invokes the API (to be specific, the API invoker network element sends the API information to the AEF, where the API information is broadcast session function service (Nsmf_MBS_session) information). An input parameter of the API information carries a broadcast service target area for requesting to perform V2X message broadcast.

Step 802*a*: The AEF network element determines a target network element based on the information about the target area of the application service and information about a service area of a network element corresponding to the network function service information.

A target network element may include a network element that is in the network element corresponding to the network function service information and whose service area at least partially overlaps the target area of the application service, or a network element that is in the network element corresponding to the network function service information and whose service area completely overlaps the target area of the application service. This is not limited.

Specifically, in one manner, the AEF network element determines, from the network element corresponding to the network function service information, a network element corresponding to a service area that at least partially overlaps the target area of the application service, and determines the network element as the target network element. In another manner, the AEF network element determines, from the network element corresponding to the network function service information, a network element whose service area completely overlaps the target area of the application service, and determines the network element as the target network element.

Because one type of network function service uniquely corresponds to one type of network element, for example, a PDU session service (Nsmf_PDUSession Service) corresponds to an SMF network element, and a communications service (Namf_Communication service) corresponds to an AMF network element, the AEF network element may uniquely determine one type of network element based on the network function service information, that is, a network element corresponding to the network function service information.

The target network element is a network element that provides a target API and that is in a network slice corresponding to the application, for example, an SMF network element or an AMF network element. For details, refer to related descriptions in the embodiment shown in FIG. 3A, FIG. 3B, FIG. 3C, and FIG. 3D.

The target network element information, for example, an IP address or a URL address of the target network element, is used to identify a target network element.

The information about the service area of the network element may be geographical location information, longitude and latitude information, administrative region information, or network area information of a mobile communications network, for example, cell identifier information, tracking area (TA) identifier information, routing area (RA) identifier information, register area identifier information, broadcast service area identifier information, or roadside unit (RoadSide Unit, RSU) identifier information.

Alternatively, step 802*a* is replaced with the following: The AEF network element obtains information about a service area of a candidate network element based on the network function service information, where the candidate network element is a network element corresponding to the network function service information. The AEF determines the target network element based on the information about the service area of the candidate network element and the information about the target area of the application service.

According to the foregoing steps, the AEF network element can accurately determine the target network element based on the service area of the application service of the API invoker network element and the information about the network function service, so that the target network element invokes the API and generates an invoking result, and provides the network function service for the API invoker network element.

Optionally, in another implementation of the embodiment shown in FIG. 8*a*, before step 802*a*, the method further includes: The AEF network element determines, based on the network function service corresponding to the application service, network element corresponding to the network function service information.

Correspondingly, step 802*a* may include: The AEF network element determines, from the network element corresponding to the network function service information, a network element whose service area at least partially overlaps the target area of the application service, and determines the network element as the target network element.

For example, the AEF network element determines, based on the network function service corresponding to the application service, that network elements that can provide the network function service are a set of SMF network elements (SMF pool). Because each SMF network element has a service area of the SMF network element, the AEF network element may select, from the set of SMF network elements, an SMF network element whose service area at least partially overlaps the target area of the application service, and determine the selected SMF network element as the target network element.

For another example, the AEF network element may alternatively select, from the network element corresponding to the network function service information, an SMF network element whose service area completely overlaps the target area of the application service, and determine the SMF network element as the target network element.

In addition, it should be additionally noted that, if the information level of the target area of the application service is inconsistent with that of the service area of the network element (for example, the target area of the application service is the administrative area information, and the service area of the network element is the register area information), the AEF may convert the target area information of the application service into a form of the same level as the service area information of a second network element.

According to the method, the AEF network element may determine the target network element, to accurately provide the network function service for the API invoker network element.

Optionally, in another implementation of the embodiment shown in FIG. 8*a*, the AEF network element may obtain the network slice information corresponding to the application service. Then, the AEF network element determines the target network element based on the network slice information, the information about the service area of the network element corresponding to the network function service information, and the information about the target area of the application service.

For example, the AEF network element determines, based on the network slice information, a network slice corresponding to the network slice information, then the AEF network element searches the network slice for network element corresponding to the network function service information, and then determines a network element that is in the network element corresponding to the network function service information and whose service area at least partially overlaps the target area of the application service as the target network element.

The AEF network element obtains the network slice information in a plurality of manners. For example, in one manner, the network slice information is carried in the third request message, and the AEF network element directly obtains the network slice information from the third request information. In another manner, the AEF network element may obtain the network slice information in the manner shown in FIG. 7. Details are not described herein again.

Figure 8B:
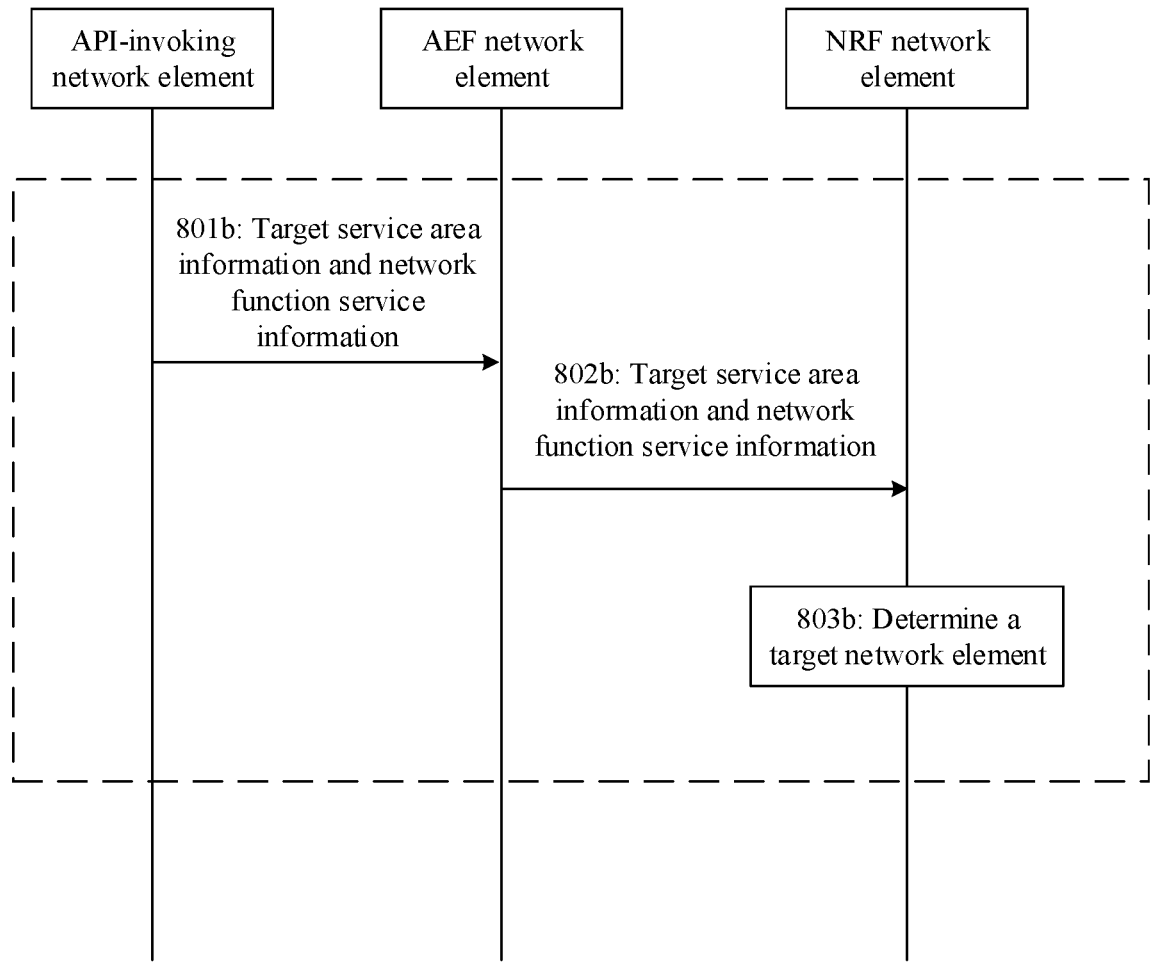

Optionally, in another implementation of the embodiment shown in FIG. 8a, the AEF network element may send the information about the target area of the application service and the network function service corresponding to the application service to an NRF network element, and then the AEF network element receives the information about the target network element from the NRF network element, as shown in FIG. 8b.

Step 801b: The API invoker network element sends the information about the target area of the application service and the network function service information corresponding to the application service to the AEF network element.

For details, refer to the description in step 801a.

Step 802b: The AEF network element sends the information about the target area of the application service and the network function service information corresponding to the application service to the NRF network element.

Step 803b: The NRF network element determines the target network element based on the information about the target area of the application service and the information about the service area of the network element corresponding to the network function service information.

Specifically, in one manner, the NRF network element determines, from the network element corresponding to the network function service information, a network element whose service area at least partially overlaps the target area of the application service as the target network element. In another manner, the NRF network element determines, from the network element corresponding to the network function service information, a network element whose service area completely overlaps the target area of the application service as the target network element.

Optionally, in step 803b, a possible implementation is as follows: The NRF network element may first determine, based on the network function service information, the network element corresponding to the network function service information, and then determine a network element that is in the network element corresponding to the network function service information and whose service area at least partially overlaps the target area of the application service as the target network element, or determine a network element that is in the network element corresponding to the network function service information and whose service area completely overlaps the target area of the application service as the target network element.

In other words, the AEF may determine the target network element information through the NRF network element. Similarly, according to the method, the NRF network element may determine the target network element, to accurately provide a network function service for the API invoker network element.

Alternatively, step 803b is replaced with the following: The NRF network element obtains information about a service area of a candidate network element based on the network function service information, where the candidate network element is a network element corresponding to the network function service information. The NRF determines the target network element based on the information about the service area of the candidate network element and the information about the target area of the application service.

Figure 8C:
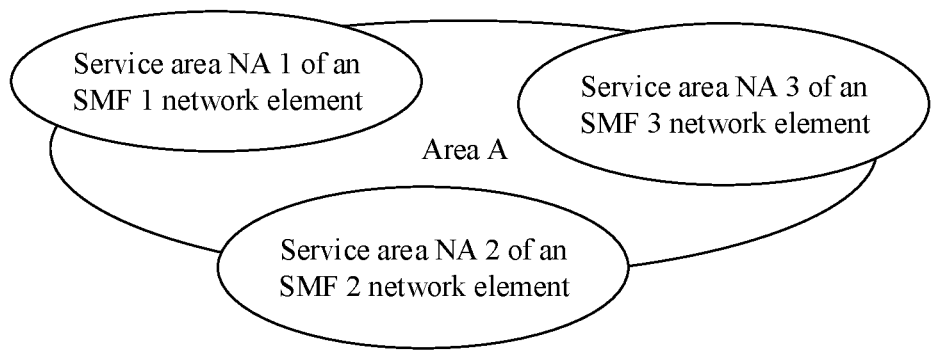
FIG. 8c is a schematic diagram of another communication method according to an embodiment of this application.

FIG. 8c describes, by using an example, a process of determining a network element that is in the network element corresponding to the network function service information and whose service area at least partially overlaps the target area of the application service as the target network function in the foregoing embodiment.

In FIG. 8c, the information about the target area of the application service provided by the API invoker network element is an area A, a network function service is a broadcast service, and information about the network function service is API information of the broadcast service. The AEF network element or the NRF network element locally searches for information about a service area of a network element corresponding to the broadcast service. An SMF 1 network element, an SMF 2 network element, and an SMF 3 network element all provide the broadcast service, and service area corresponding to the SMF 1 network element, the SMF 2 network element, and the SMF 3 network element are respectively a service area NA 1 of the SMF 1 network element, a service area NA 2 of the SMF 2 network element, and a service area NA 3 of the SMF 3 network element. Because service area of the SMF 1 network element, the SMF 2 network element, and the SMF 3 network element all overlap the area A, the AEF network element or the NRF network element determines the SMF 1 network element, the SMF 2 network element, and the SMF 3 network element as target network elements.

It should be noted that related reference may be made between the embodiments of this application, for example, nouns and steps. This is not limited.

Figure 9:
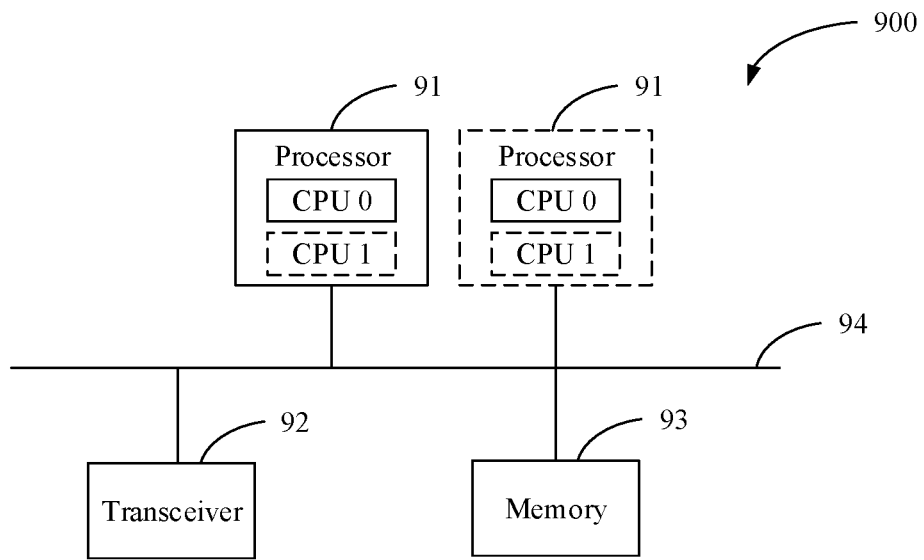
FIG. 9 is a schematic diagram of an apparatus according to this application.

Based on a same inventive concept, FIG. 9 is a schematic diagram of an apparatus according to this application. The apparatus 900 includes at least one processor 91, and the at least one processor is coupled to at least one memory.

Optionally, the apparatus further includes a transceiver 92.

Optionally, the apparatus further includes a memory 93, and the memory 93 is coupled to at least one processor 91.

Further, the processor 91, the transceiver 92, and the memory 93 may be connected by using a communications bus 94.

The memory 93 is configured to store application program code for performing the solutions of the present invention, and execution of the solutions is controlled by the processor 91.

The processor 91 is configured to execute a function or an action of the network element in the foregoing method embodiment, for example, invoke the application program code in the memory 93, so as to implement functions of the foregoing network elements. Details are as follows.

In a first application scenario, the apparatus 900 may be a CCF network element, or may be a system on chip or a chip on a CCF network element. The processor 91 may perform the method performed by the CCF network element in any one of the foregoing embodiments. For related features, refer to the foregoing descriptions. Details are not described herein again.

In a second application scenario, the apparatus 900 may be an AEF network element, or may be a system on chip or a chip on an AEF network element. The processor 91 may perform the method performed by the AEF network element in any one of the foregoing embodiments. For related features, refer to the foregoing descriptions. Details are not described herein again.

In a third application scenario, the apparatus 900 may be a first network element, or may be a system on chip or a chip on a first network element. The first network element may be an AEF network element, a PCF network element, or an APF network element. The processor 91 may perform the method performed by the first network element in any one of the foregoing embodiments. For related features, refer to the foregoing descriptions. Details are not described herein again.

In a fourth application scenario, the apparatus 900 may be an API invoker network element, or may be a system on chip or a chip on an API invoker network element. The processor 91 may perform the method performed by the API invoker network element in any one of the foregoing embodiments. For related features, refer to the foregoing descriptions. Details are not described herein again.

In a fifth application scenario, the apparatus 900 may be an NRF network element, or may be a system on chip or a chip on an NRF network element. The processor 91 may perform the method performed by the NRF network element in any one of the foregoing embodiments. For related features, refer to the foregoing descriptions. Details are not described herein again.

The processor 91 may be a general-purpose central processing unit (CPU), a microprocessor, an ASIC, or one or more integrated circuits configured to control program execution in the solutions of the present invention.

The communications bus 94 may include a path for transferring information between the foregoing units.

The transceiver 92 is configured to communicate with another device or a communications network. The transceiver 92 may be a communications interface, for example, a wired interface, a wireless interface, or a Wi-Fi interface, or the transceiver includes a radio frequency circuit.

The memory 93 may be a ROM or another type of static storage device that can store static information and an instruction, or a RAM or another type of dynamic storage device that can store information and an instruction, or may be an electrically erasable programmable read-only memory (EEPROM), a compact disc read-only memory (CD-ROM) or another optical disc storage, an optical disc storage (including a compact optical disc, a laser disc, an optical disc, a digital versatile optical disc, a blue optical disc, and the like), a magnetic disk storage medium or another magnetic storage device, or any other medium that can carry or store expected program code in an instruction or data structure form and can be accessed by a computer. However, this is not limited herein. The memory 93 may exist independently, or may be connected to the processor 91 by using the communications bus. The memory 93 may alternatively be integrated with the processor.

During specific implementation, in an embodiment, the processor 91 may include one or more CPUs, such as a CPU 0 and a CPU 1 in FIG. 9.

During specific implementation, in an embodiment, the apparatus 900 may include a plurality of processors, for example, the processor 91 and a processor 98 in FIG. 9. Each of the processors may be a single-core (single-CPU) processor, or may be a multi-core (multi-CPU) processor. The processors herein may be one or more devices, circuits, and/or processing cores for processing data (for example, a computer program instruction).

In this application, function modules in the apparatus may be obtained through division based on the foregoing method examples. For example, the function modules may be obtained through division based on corresponding functions, or two or more functions may be integrated into one processing module. The foregoing integrated module may be implemented in a form of hardware, or may be implemented in a form of a software function module. It should be noted that, in this application, module division is an example, and is merely logical function division. In actual implementation, another division manner may be used. For example, the function modules is obtained through division based on corresponding functions.

Figure 10:
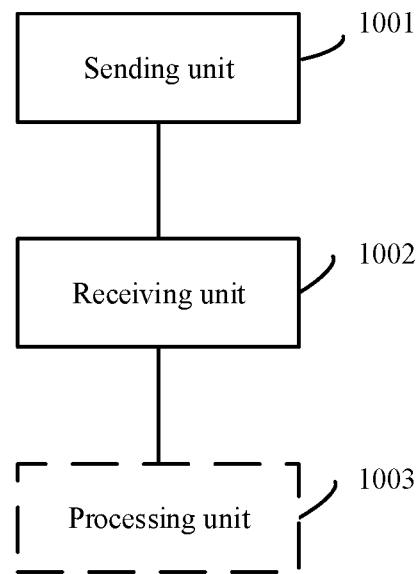
FIG. 10 is a schematic diagram of still another apparatus according to this application.

FIG. 10 is a schematic diagram of an apparatus.

In an application, the apparatus may be the CCF network element in the foregoing embodiments or a system on chip or a chip on the CCF network element. The apparatus includes a sending unit 1001 and a receiving unit 1002.

The sending unit 1001 is configured to send reference information of an application to a first network element.

The receiving unit 1002 is configured to receive, from the first network element, network slice information corresponding to the application.

The first network element is an AEF network element, an APF network element, or a PCF network element. The reference information of the application includes at least one of an API invoker network element identifier, an ASP identifier, an application identifier, and an APN.

In a possible implementation, the receiving unit 1002 is further configured to receive an application programming interface API publish request message from an API publishing network element, where the API publish request message includes a correspondence between the network slice information and API information.

In a possible implementation, the receiving unit 1002 is further configured to:
before sending the reference information of the application to the first network element, receive an API discover request message from an API invoker network element, where the API discover request message includes an API inquiry parameter and the reference information that is of the application. The API inquiry parameter includes at least one of an API type, a transfer protocol type, and interface information.

The apparatus further includes a processing unit 1003, configured to: after receiving, from the first network element, the network slice information corresponding to the application, determine target API information based on the correspondence between the network slice information and the API information, the network slice information, and the API inquiry parameter.

In a possible implementation, the sending unit 1001 is further configured to send the network slice information and the target API information to the API invoker network element.

In a possible implementation, the sending unit 1001 is further configured to: when the sending unit 1001 does not store the network slice information corresponding to the reference information of the application, send the reference information of the application to the first network element.

It should be understood that the apparatus may be configured to implement the steps performed by the CCF network element in the foregoing method embodiments. For related features, refer to the foregoing descriptions. Details are not described herein again.

Figure 11:
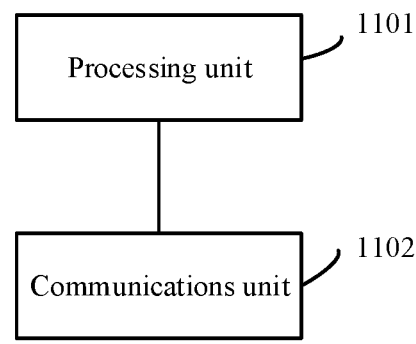
FIG. 11 is a schematic diagram of another apparatus according to this application.

FIG. 11 shows another apparatus.

In an application, the apparatus may further be an AEF network element or a system on chip or a chip on an AEF network element. The apparatus may be configured to perform actions of the AEF network element in the foregoing method embodiments.

A communications unit 1102 is configured to send reference information of an application to a PCF network element.

A processing unit 1101 is configured to receive, from the PCF network element, network slice information corresponding to the application.

In a possible implementation, the processing unit 1101 is further configured to:
  before sending the reference information of the application to the PCF network element, receive a first invoking request message from an API invoker network element, where the first invoking request message includes the reference information of the application and target API information requested to be invoked;
  after receiving, from the PCF network element, the network slice information corresponding to the application, send a network function discovery request message to a network function repository function NRF network element, where the network function discovery request message includes the network slice information and the target API information; and
  receive a network function discovery response message from the NRF network element, where the network function discovery response message includes target network element information corresponding to the network slice information and the target API.

In a possible implementation, the processing unit 1101 is further configured to:
  after receiving the network function discovery response message from the NRF network element, send, based on the first invoking request message, a second invoking request message to a target network element corresponding to the target network element information, where the second invoking request message includes the API information;
  receive an invoking result of the API from the target network element; and
  send the invoking result to the API invoker network element.

In a possible implementation, the processing unit 1101 is specifically configured to:
  when the processing unit 1101 does not store the network slice information corresponding to the reference information of the application, send the reference information of the application to the PCF network element.

It should be understood that the apparatus may be configured to implement steps performed by the AEF network element in the communication method in the foregoing embodiments of the present invention. For related features, refer to the foregoing descriptions. Details are not described herein again.

In another application, the apparatus shown in FIG. 10 may alternatively be a first network element or a system on chip or a chip on a first network element. The first network element may be an AEF network element, a PCF network element, or an APF network element. The apparatus may be configured to perform actions of the first network element in the foregoing method embodiments.

The receiving unit 1002 is configured to receive reference information of an application from a common application programming interface framework core function CCF network element.

The sending unit 1001 is configured to send, based on the reference information of the application, network slice information corresponding to the application to the CCF network element.

It should be understood that the apparatus may be configured to implement steps performed by the first network element in the communication method in the foregoing embodiments of the present invention. For related features, refer to the foregoing descriptions. Details are not described herein again.

In another application, the apparatus shown in FIG. 11 may further be an AEF network element or a system on chip or a chip on an AEF network element. For example, the apparatus may be configured to perform actions of the AEF network element in the embodiment in FIG. 8*a* or FIG. 8*b*.

The communications unit 1102 is configured to receive, from an API invoker network element, information about a target area of an application service and network function service information corresponding to the application service.

The processing unit 1101 is configured to determine a target network element based on the information about the target area of the application service and information about a service area of a network element corresponding to the network function service information.

The target network element is configured to provide, for the API invoker network element, a network function service corresponding to the network function service information.

The target network element may include a network element that is in the network element corresponding to the network function service information and whose service area at least partially overlaps the target area of the application service, or a network element that is in the network element corresponding to the network function service information and whose service area completely overlaps the target area of the application service. This is not limited.

In a possible implementation, the processing unit 1101 is further configured to determine, from the network element corresponding to the network function service information, a network element whose service area at least partially overlaps the target area of the application service as the target network element.

In a possible implementation, the processing unit 1101 is further configured to: obtain the network slice information, and then determine the target network element based on the network slice information, the information about the service area of the network element corresponding to the network function service information, and the information about the target area of the application service.

It should be understood that the apparatus may be configured to implement steps performed by the AEF network element in the communication method in the foregoing embodiments of the present invention. For related features, refer to the foregoing descriptions. Details are not described herein again.

In another application, the apparatus shown in FIG. 11 may further be an NRF network element or a system on chip or a chip on an NRF network element. For example, the apparatus may be configured to perform actions of the NRF network element in the embodiment shown in FIG. 8*b*.

The communications unit 1102 is configured to receive, from an AEF network element, information about a target area of an application service and network function service information corresponding to the application service.

The processing unit 1101 is configured to determine a target network element based on the information about the target area of the application service and the information about a service area of a network element corresponding to the network function service information.

For the foregoing nouns or actions, refer to related descriptions in the embodiment shown in FIG. 8b. Details are not described again.

In this embodiment, the apparatus is presented in a form in which function modules are obtained through division based on corresponding functions, or the service control entity is presented in a form in which function modules are obtained through division in an integrated manner. The "module" herein may be an ASIC, a circuit, a processor and a memory that execute one or more software programs or firmware programs, an integrated logic circuit, and/or another component that can provide the foregoing functions.

All or some of the foregoing embodiments may be implemented through software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions according to the embodiments of the present invention are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a soft disk, a hard disk, or a magnetic tape), an optical medium (for example, DVD), a semiconductor medium (for example, a solid-state drive (Solid State Disk, SSD)), or the like.

Although the present invention is described with reference to the embodiments, in a process of implementing the present invention that claims protection, a person skilled in the art may understand and implement another variation of the disclosed embodiments by viewing the accompanying drawings, disclosed content, and the accompanying claims. In the claims, "comprising" does not exclude another component or another step, and "a" or "one" does not exclude a case of multiple. A single processor or another unit may implement several functions enumerated in the claims. Some measures are recorded in dependent claims that are different from each other, but this does not mean that these measures cannot be combined to produce a better effect.

A person skilled in the art should understand that the embodiments of this application may be provided as a method, an apparatus (device), a computer-readable storage medium, or a computer program product. Therefore, this application may use a form of a hardware-only embodiment, a software-only embodiment, or an embodiment with a combination of software and hardware, which are collectively referred to as "modules" or "systems" herein.

This application is described with reference to the flowcharts and/or block diagrams of the method, the apparatus (device), and the computer program product this application. It should be understood that computer program instructions may be used to implement each procedure and/or each block in the flowcharts and/or the block diagrams and a combination of a procedure and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

These computer program instructions may alternatively be stored in a computer-readable memory that can instruct a computer or another programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

The computer program instructions may alternatively be loaded onto a computer or another programmable data processing device, so that a series of operations and steps are performed on the computer or the another programmable device, to generate computer-implemented processing. Therefore, the instructions executed on the computer or the another programmable device provide steps for implementing a specific function in one or more procedures in the flowcharts and/or in one or more blocks in the block diagrams.

What is claimed is:

1. A communication method comprising:
receiving, by an application programming interface exposure function (AEF) network element from an application programming interface (API) invoker network element, information about a target area of an application service and network function service information corresponding to the application service, wherein the target area of the application service is an area based on the application service being provided, and wherein the application service is provided by an application service provider (ASP) which is different from a user equipment (UE); and
determining, by the AEF network element based on the information about the target area of the application service and information about a service area of a network element corresponding to the network function service information, a target network element providing a network function service corresponding to the network function service information for the API invoker network element.

2. The method according to claim 1, wherein the determining the target network element further comprises:
sending, by the AEF network element, the information about the target area of the application service and network function service information corresponding to the application service, to an NF Repository Function (NRF),
receiving, the information of the target network element from the NRF.

3. The method according to claim 1, wherein the determining the target network element further comprises:
obtaining, by the AEF, service area information of at least one candidate network element corresponding to the network function service information,
determining, by the AEF based on the service area information of the at least one candidate network element and the target area of the application service, the target network element from the at least one candidate network element.

4. The method according to claim 1, wherein the target network element comprises a network element that is in the network element corresponding to the network function service information and whose service area at least partially overlaps the target area of the application service.

5. The method according to claim 1, further comprising:
obtaining, by the AEF network element, network slice information corresponding to the application service; and
wherein the determining the target network element further comprises:
determining, by the AEF network element, the target network element based on the network slice information, the information about the service area of the network element corresponding to the network function service information, and the information about the target area of the application service.

6. A communication method comprising:
sending, by an application programming interface (API) invoker network element to an application programming interface exposure function (AEF) network element, information about a target area of an application service and network function service information corresponding to the application service, wherein the target area of the application service is an area based on the application service being provided, and wherein the application service is provided by an application service provider (ASP) which is different from a user equipment (UE); and
determining, by the AEF network element based on the information about the target area of the application service and information about a service area of a network element corresponding to the network function service information, a target network element providing a network function service corresponding to the network function service information for the API invoker network element.

7. The method according to claim 6, wherein the determining the target network element further comprises:
sending, by the AEF network element, the information about the target area of the application service and network function service information corresponding to the application service, to an NF Repository Function (NRF), and
receiving, the information of the target network element from the NRF.

8. The method according to claim 6, wherein the determining the target network element further comprises:
obtaining, by the AEF, service area information of at least one candidate network element corresponding to the network function service information, and
determining, by the AEF based on the service area information of the at least one candidate network element and the target area of the application service, the target network element from the at least one candidate network element.

9. A device comprising:
a computer-readable storage medium configured to store programming instructions, and
a processor coupled to the computer-readable storage medium,
wherein the programming instructions upon being executed by the processor cause the device to implement operations including:
receiving from an application programming interface (API) invoker network element, information about a target area of an application service and network function service information corresponding to the application service, wherein the target area of the application service is an area based on the application service being provided, and wherein the application service is provided by an application service provider (ASP) which is different from a user equipment (UE); and
determining, based on the information about the target area of the application service and information about a service area of a network element corresponding to the network function service information, a target network element providing a network function service corresponding to the network function service information for the API invoker network element.

10. The device according to claim 9, wherein the operations further comprise:
sending the information about the target area of the application service and network function service information corresponding to the application service, to an NF Repository Function (NRF), and
receiving the information of the target network element from the NRF.

11. The device according to claim 9, wherein the operations further comprise:
obtaining service area information of at least one candidate network element corresponding to the network function service information, and
determining, based on the service area information of the at least one candidate network element and the target area of the application service, the target network element from the at least one candidate network element.

12. The device according to claim 9, wherein the target network element comprises a network element that is in the network element corresponding to the network function service information and whose service area at least partially overlaps the target area of the application service.

13. The device according to claim 9, wherein the operations further comprise:
obtaining network slice information corresponding to the application service; and
wherein the operation of determining the target network element further comprises:
determining the target network element based on the network slice information, the information about the service area of the network element corresponding to the network function service information, and the information about the target area of the application service.

14. A computer program product comprising instructions that are stored on a computer-readable medium and that, when executed by one or more processors, cause a first access and mobility management function network element to:
receiving from an application programming interface (API) invoker network element, information about a target area of an application service and network function service information corresponding to the application service, wherein the target area of the application service is an area based on the application service being provided, and wherein the application service is provided by an application service provider (ASP) which is different from a user equipment (UE); and
determining, based on the information about the target area of the application service and information about a service area of a network element corresponding to the network function service information, a target network element providing a network function service corresponding to the network function service information for the API invoker network element.

* * * * *